(12) United States Patent
Li et al.

(10) Patent No.: US 12,443,668 B2
(45) Date of Patent: Oct. 14, 2025

(54) SYSTEM AND METHOD FOR RANKING CONTENT ITEMS

(71) Applicant: Yahoo Assets LLC, New York, NY (US)

(72) Inventors: Liuqing Li, Santa Clara, CA (US);
Yufeng Ma, Santa Clara, CA (US);
Donghyun Kim, San Jose, CA (US);
Rao Shen, Sunnyvale, CA (US); Kostas Tsioutsiouliklis, Saratoga, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/112,678

(22) Filed: Feb. 22, 2023

(65) Prior Publication Data

US 2024/0281483 A1 Aug. 22, 2024

(51) Int. Cl.
*G06F 16/00* (2019.01)
*G06F 16/9535* (2019.01)
*G06F 16/954* (2019.01)

(52) U.S. Cl.
CPC ........ *G06F 16/9535* (2019.01); *G06F 16/954* (2019.01)

(58) Field of Classification Search
None
See application file for complete search history.

(56) References Cited

U.S. PATENT DOCUMENTS

| | | | |
|---|---|---|---|
| 8,180,768 B2 * | 5/2012 | Ceri | G06F 16/9532 707/728 |
| 2003/0120654 A1 * | 6/2003 | Edlund | G06F 16/9532 |
| 2005/0246328 A1 * | 11/2005 | Zhang | G06F 16/9538 |
| 2006/0195440 A1 * | 8/2006 | Burges | G06F 16/337 707/999.005 |
| 2008/0294617 A1 * | 11/2008 | Chakrabarti | G06F 16/9535 707/999.005 |
| 2009/0019035 A1 * | 1/2009 | House | G06F 16/334 707/E17.084 |
| 2009/0198566 A1 * | 8/2009 | Greenberg | G06Q 30/0236 707/999.005 |
| 2010/0235351 A1 * | 9/2010 | Iwasa | G06F 16/48 707/723 |
| 2012/0130974 A1 * | 5/2012 | Leigh | G06F 16/953 707/706 |
| 2013/0144870 A1 * | 6/2013 | Gupta | G06F 16/951 707/726 |
| 2014/0122456 A1 * | 5/2014 | Dies | G06F 16/353 707/723 |
| 2014/0122475 A1 * | 5/2014 | Li | G06F 16/3326 707/734 |

(Continued)

*Primary Examiner* — Polina G Peach
(74) *Attorney, Agent, or Firm* — Cooper Legal Group LLC

(57) ABSTRACT

In an example, in response to a request for content, content items may be identified. Content item scores associated with the content items may be determined using a content scoring model. A first ranked list may be generated based upon the content item scores using an exploration model. The first ranked list is indicative of rankings of the content items. A content item selection interface may be generated based upon the first ranked list. The content item selection interface may include selectable objects, corresponding to the content items, arranged according to rankings indicated by the first ranked list.

20 Claims, 16 Drawing Sheets

(56) References Cited

U.S. PATENT DOCUMENTS

| | | | | |
|---|---|---|---|---|
| 2015/0058358 | A1* | 2/2015 | Xu | G06F 16/335 |
| | | | | 707/748 |
| 2015/0169702 | A1* | 6/2015 | Hannan | G06F 16/951 |
| | | | | 707/722 |
| 2015/0324468 | A1* | 11/2015 | Okamoto | G06F 16/9535 |
| | | | | 707/706 |
| 2016/0092581 | A1* | 3/2016 | Joshi | G06F 16/9535 |
| | | | | 707/732 |
| 2017/0140053 | A1* | 5/2017 | Vorobev | G06N 20/00 |
| 2017/0185602 | A1* | 6/2017 | Gusev | G06F 16/951 |
| 2017/0308609 | A1* | 10/2017 | Berkhin | G06F 16/951 |
| 2017/0316483 | A1* | 11/2017 | Lester | G06Q 30/0641 |
| 2018/0075137 | A1* | 3/2018 | Lifar | G06F 16/337 |
| 2018/0173376 | A1* | 6/2018 | Cohen | H04L 67/10 |
| 2019/0034432 | A1* | 1/2019 | Rybalchenko | G06N 20/00 |
| 2019/0163758 | A1* | 5/2019 | Zhivotvorev | G06F 16/24578 |
| 2019/0258741 | A1* | 8/2019 | Chen | G06F 16/9536 |
| 2020/0110754 | A1* | 4/2020 | Lamburt | G06F 16/24578 |
| 2020/0112769 | A1* | 4/2020 | Potluru | H04N 21/4668 |
| 2020/0372435 | A1* | 11/2020 | Kenthapadi | G06F 16/90335 |
| 2020/0401881 | A1* | 12/2020 | Thadani | G06N 7/01 |
| 2021/0192001 | A1* | 6/2021 | Brown | H04N 21/44 |
| 2022/0005070 | A1* | 1/2022 | Raviv | G06Q 30/0206 |
| 2022/0129709 | A1* | 4/2022 | Canal | G06F 17/11 |
| 2022/0171782 | A1* | 6/2022 | Katsev | G06F 16/9538 |
| 2022/0253470 | A1* | 8/2022 | Amrite | G06F 16/3326 |
| 2023/0252281 | A1* | 8/2023 | Shamir | G06F 18/2193 |
| | | | | 706/15 |
| 2023/0401267 | A1* | 12/2023 | Cai | G06F 16/9535 |
| 2024/0403304 | A1* | 12/2024 | Tsoy | G06F 16/248 |

* cited by examiner

SYSTEM AND METHOD FOR RANKING CONTENT ITEMS

BACKGROUND

Many services, such as websites, applications, etc. may provide platforms for viewing media. For example, a user may interact with a service. While interacting with the service, selected media (e.g., news articles, videos, songs, etc.) may be presented to the user.

SUMMARY

In accordance with the present disclosure, one or more computing devices and/or methods are provided. In an example, a request for content associated with a client device may be received. In response to receiving the request for content, a plurality of content items may be identified. A plurality of content item scores associated with the plurality of content items may be determined using a content scoring model. A first ranked list may be generated based upon the plurality of content item scores using an exploration model. The first ranked list is indicative of rankings of the plurality of content items. A content item selection interface may be generated based upon the first ranked list. The content item selection interface may comprise a plurality of selectable objects corresponding to content items of the plurality of content items. The plurality of selectable objects may be arranged according to rankings indicated by the first ranked list.

In accordance with the present disclosure, one or more computing devices and/or methods are provided. In an example, a request for content associated with a client device may be received. In response to receiving the request for content, a plurality of content items may be identified. A plurality of content item scores associated with the plurality of content items may be determined using a content scoring model. A first ranked list may be generated based upon the plurality of content item scores using an exploration model. The first ranked list is indicative of rankings of the plurality of content items. A content item presentation interface may be generated based upon the first ranked list. The content item presentation interface may comprise the plurality of content items. The plurality of content items may be arranged, in the content item presentation interface, according to rankings indicated by the first ranked list.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
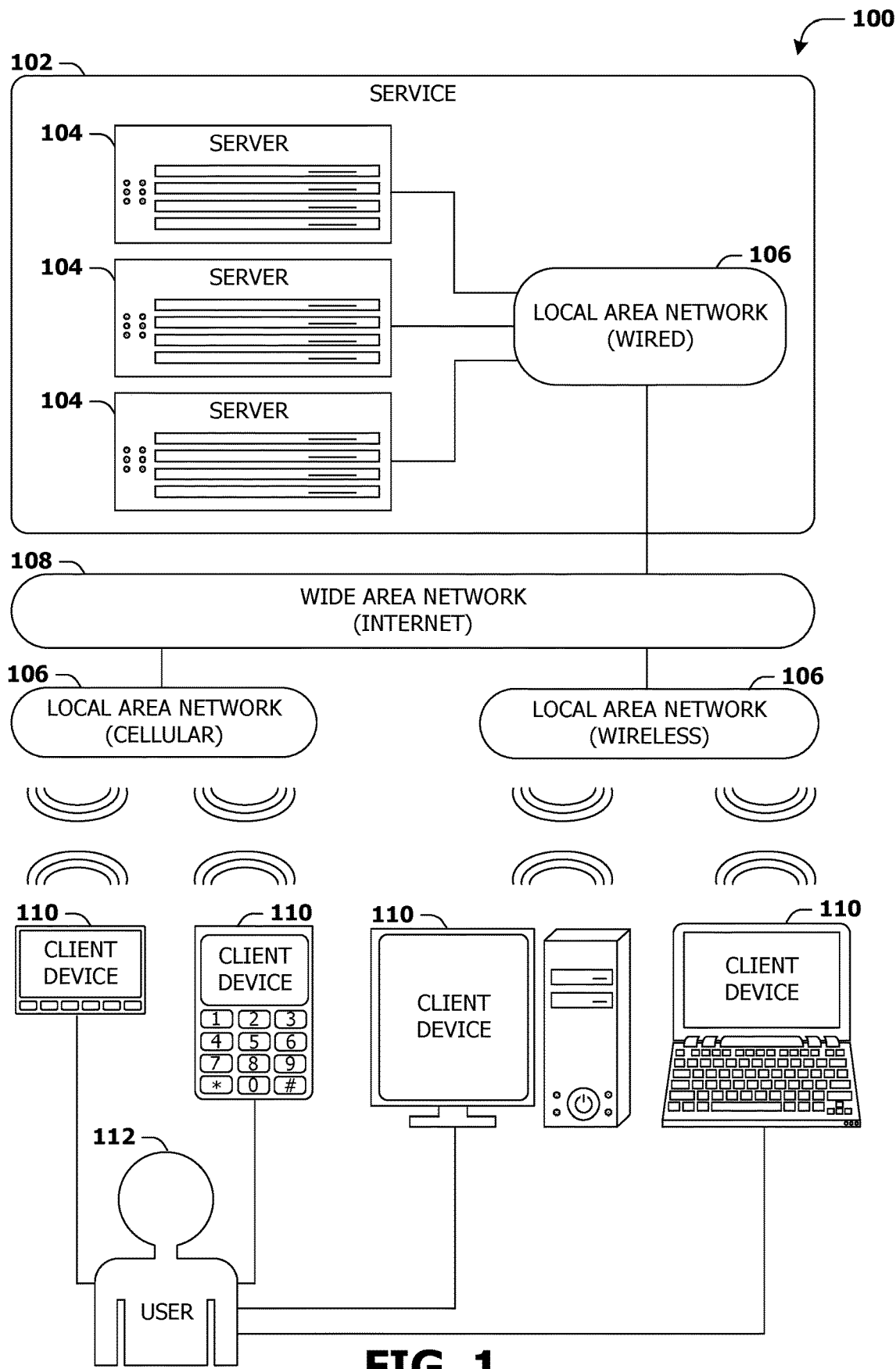
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
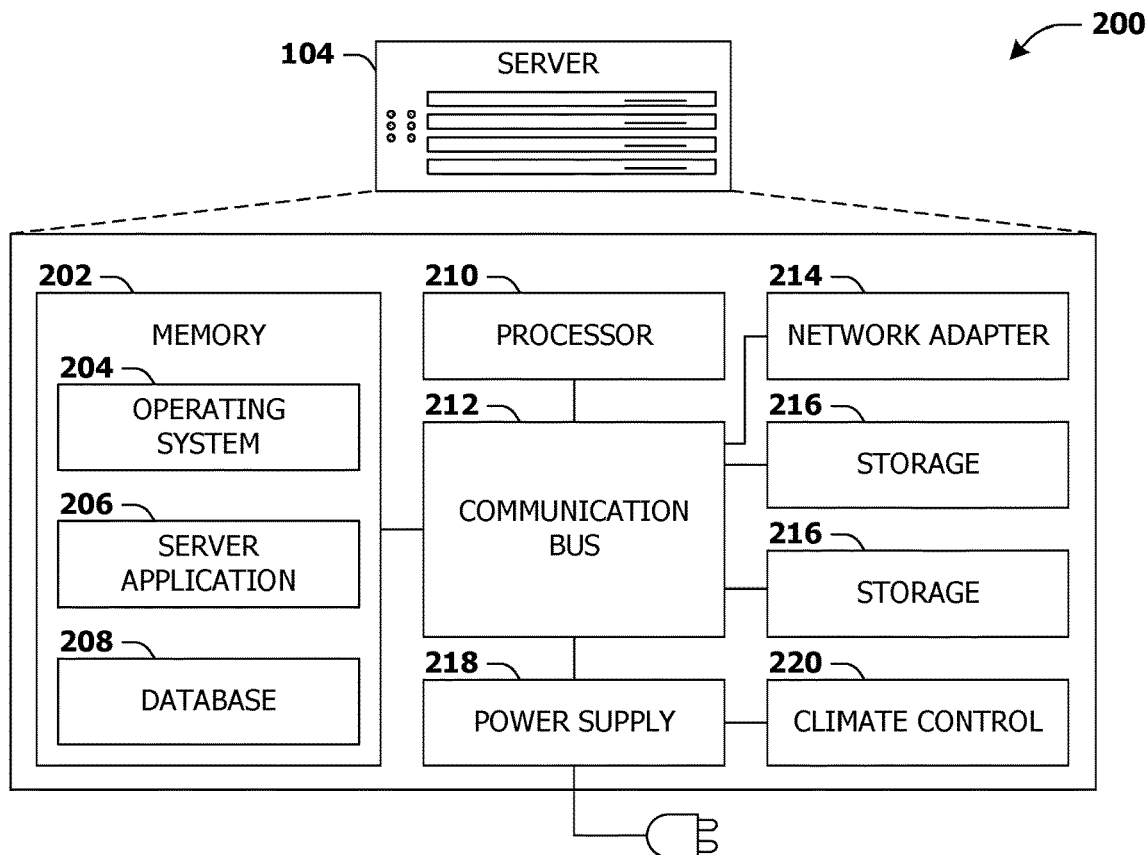
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
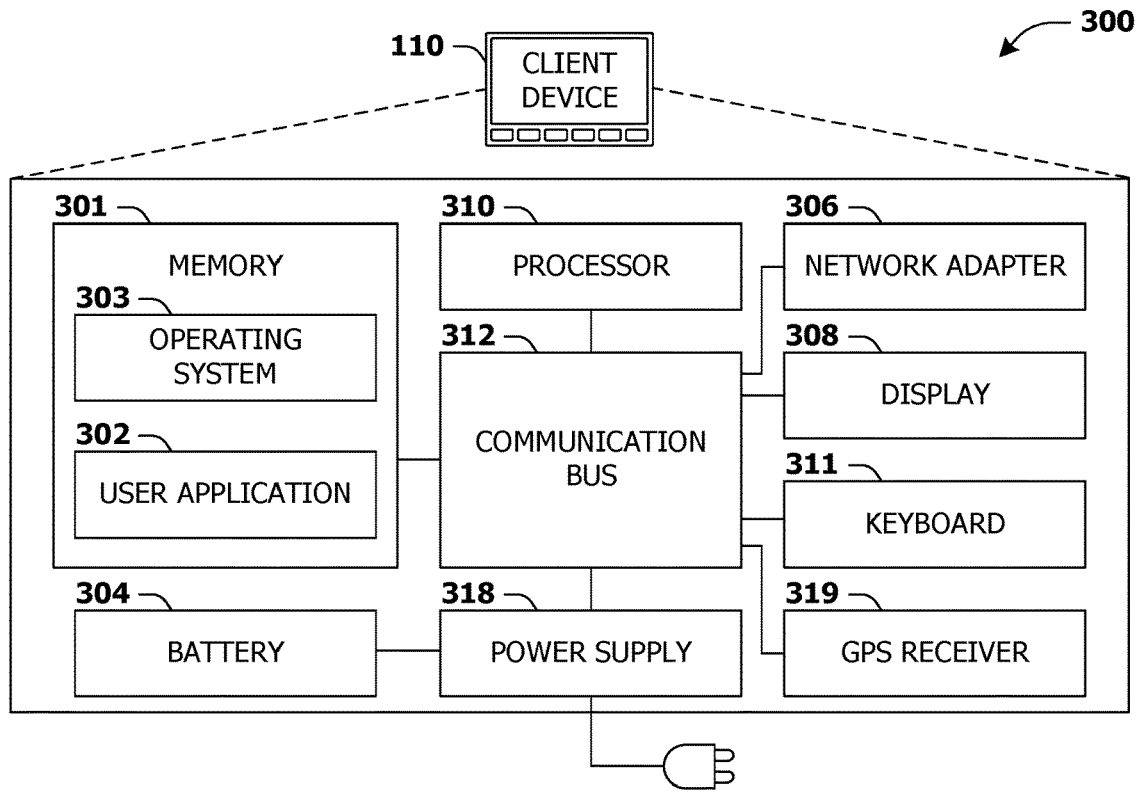
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for ranking content items are provided. A user (and/or a client device associated with the user) may access and/or interact with a service, such as a browser, software, a website, an application, an operating system, etc. that provides a platform for viewing and/or downloading content from a server associated with a content system. For example, the content system may provide a list of selectable objects associated with a plurality of content items for presentation via the client device. Each selectable object in the list may comprise at least one of a title, a link, a graphical representation, etc. associated with a corresponding content item of the plurality of content items (e.g., in response to a selection of the selectable object, the corresponding content item may be presented via the client device). Selectable objects in the list may be arranged based upon rankings of the content items (e.g., selectable objects associated with higher ranked content items may be positioned higher than selectable objects associated with lower ranked content items). The user may use the list of selectable objects to access one or more content items (of the plurality of content items) in which the user has an interest. However, if the determined rankings of the plurality of content items are at odds with the user's preference of ranking, content items the user does not have an interest in may be ranked higher than content items the user does have an interest in. Thus, undesired selectable objects of the (higher ranked) content items the user does not have an interest in may be positioned higher than desired selectable objects of the lower ranked content items the user does have an interest in. Accordingly, in order to access content in which the user has an interest, the user may need to scroll past the undesired selectable objects to reach the desired selectable objects. In accordance with the present disclosure, one or more computing devices, techniques and/or systems are provided that may produce more accurate ranked lists (e.g., rankings that are more aligned with ranking preferences of a user) for an improved user experience.

Some embodiments of the present disclosure may employ an exploration-based approach to rank content items. In an example, in response to receiving a request for content associated with a client device, a plurality of content item scores associated with a plurality of content items (to be ranked) may be determined using a content scoring model. An exploration model may be used to generate a first ranked list based upon the plurality of content item scores.

In some embodiments of the present disclosure, the first ranked list may be generated (using the exploration model) by performing an iterative sampling process comprising probability-based sampling iterations. For example, probabilities associated with the plurality of content items may be determined based upon the plurality of content item scores. A sampling iteration of the iterative sampling process may be associated with a given ranking of the first ranked list, and may comprise sampling a content item, for the given ranking of the first ranked list, according to the determined probabilities. Accordingly, although a first content item may be associated with a higher content item score than a second content item, by performing probability-based sampling according to the determined probabilities, there is still a likelihood that the second content item is sampled for the given ranking, thus behaving as exploration. It may be appreciated that implementing an exploration-based approach to generate the first ranked list may allow for the ranking system to (i) perform new and/or unique actions (e.g., provide new and/or unique ranked lists), and/or (ii) learn from feedback associated with the new and/or unique actions, which may result in the first ranked list being generated with increased accuracy, and thus the first ranked list may be more aligned with ranking preferences of a user of the client device (thereby providing for an improved user experience for the user, for example). Selectable objects associated with the plurality of content items may be arranged in a first content item selection interface according to rankings indicated by the first ranked list. The first content item selection interface may be provided for display on the client device.

In some embodiments of the present disclosure, a reinforcement learning framework may be implemented in which a ranking system (e.g., an agent of the reinforcement learning framework) comprising the content scoring model and/or the exploration model learns (e.g., continuously learns over time) based upon actions the ranking system takes (e.g., ranked lists output by the ranking system for use in arranging selectable objects of content item selection interfaces) and/or feedback (e.g., rewards associated with user engagement with content item selection interfaces) associated with the actions. For example, a user interaction profile indicative of one or more user interactions with the first content item selection interface may be determined based upon one or more signals received after providing the content item selection interface for display on the client device. Alternatively and/or additionally, a user activeness score may be determined (e.g., using a survival model) based upon visit events in which the user visits an internet resource (e.g., an application, a website, a web page, etc.) associated with the content item selection interface. In some examples, the user interaction profile (and/or an interaction score determined based upon the user interaction profile) and/or the user activeness score may be used to modify (e.g., update, such as optimize and/or train) the ranking system (e.g., the content scoring model and/or the exploration model), which may improve an accuracy of the ranking system. Accordingly, the ranking system may be updated (e.g., continuously updated) over time (e.g., through online learning). In an example, the user interaction profile (and/or the interaction score) may be correspond to a short-term reward (e.g., feedback reflective of an impact of the first content item selection interface on short-term behavior of the user), while the user activeness score may correspond to a long-term reward (e.g., feedback reflective of an impact of the first content item selection interface on long-term behavior of the user, such as how much time it may take for the user to return to the internet resource). Using both short-term rewards and long-term rewards to update the ranking system may teach the ranking system (e.g., the content scoring model and/or the exploration model) to account for both short-term feedback and long-term feedback when providing ranked lists, which may (further) improve the accuracy of the ranking system.

In some examples, the feedback used to update the ranking system (e.g., the content scoring model and/or the exploration model) may comprise a list-level metric associated with a relationship among content items of a ranked list. For example, the interaction score may comprise a list-level metric, such as a normalized Discounted Cumulative Gain (nDCG), which may be indicative of a quality of the selected ranked list. It may be appreciated that using list-level metrics (e.g., nDCG metrics) to update the ranking system may teach the ranking system (e.g., the content scoring model and/or the exploration model) to account for relationships between content items of a ranked list, which may increase an accuracy of the ranking system in comparison with some systems, such as systems that (only) consider per-item prediction performance.

It may be appreciated that implementing the reinforcement learning framework in which the ranking system (e.g., the content scoring model and/or the exploration model) learns through actions taken and/or resulting feedback may provide for at least one of reduced manual effort, reduced required processing power, increased efficiency, etc. in comparison with some supervised learning-based ranking systems that (i) may require manual preparation of a large amount of data for training, (ii) may require large amounts of processing power to process the data, and/or (iii) may be relatively unsustainable due to user interests and/or content changing over time, which may lead to more workload, maintenance and/or model retraining.

Figure 4:
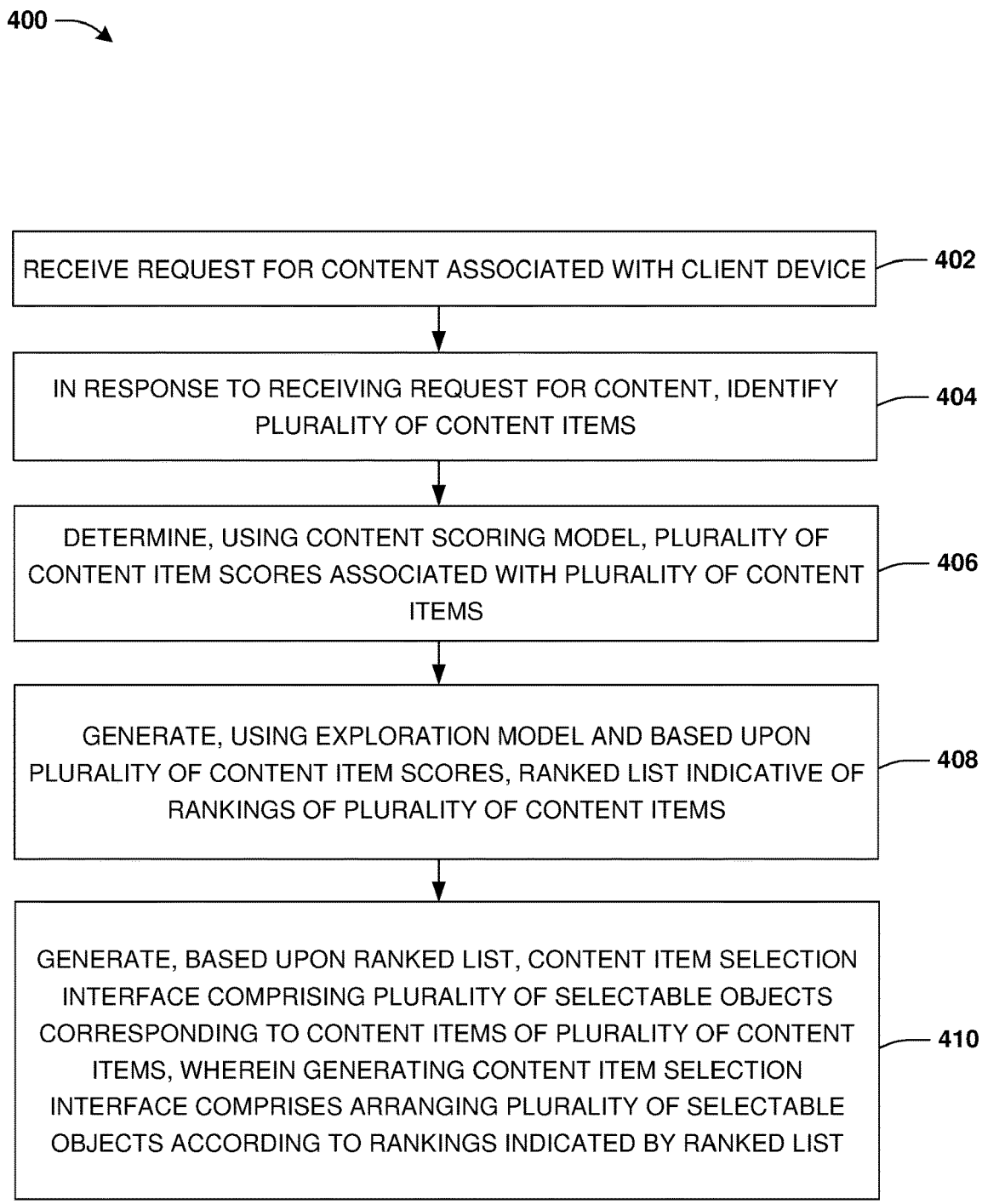
FIG. 4 is a flow chart illustrating an example method for determining features and/or selecting content based upon the determined features.

An embodiment of ranking content items is illustrated by an example method 400 of FIG. 4. A content system for presenting content via devices may be provided. In some examples, the content system may provide content items (e.g., news articles, informational articles, videos, advertisements, images, links, dating profiles, social media profiles, social media posts, blog posts, songs, etc.) to be presented via one or more internet resources associated with the content system. The one or more internet resources may correspond to at least one of one or more applications (e.g., web applications, mobile applications, etc.), one or more websites, one or more web pages, etc. associated with the content system. The content system may provide, via an internet resource of the one or more internet resources, a content item selection interface corresponding to a ranked list of content items. The content item selection interface may comprise a plurality of selectable objects associated with content items of the ranked list. The plurality of selectable objects may be arranged according to rankings indicated by the ranked list. A user interested in a content item can select a corresponding selectable object to access the content item.

At 402, a request for content associated with a first client device is received (by the content system, for example). The request for content may correspond to a request to present a first content item selection interface on the first client device via a first internet resource (e.g., an application, a website, a web page, etc.). In an example, the request for content may be received from the first client device. The request for content may correspond to a request to access the first internet resource (e.g., the request to access the first internet resource may comprise an indication of a web address of the first internet resource).

Figure 5A:
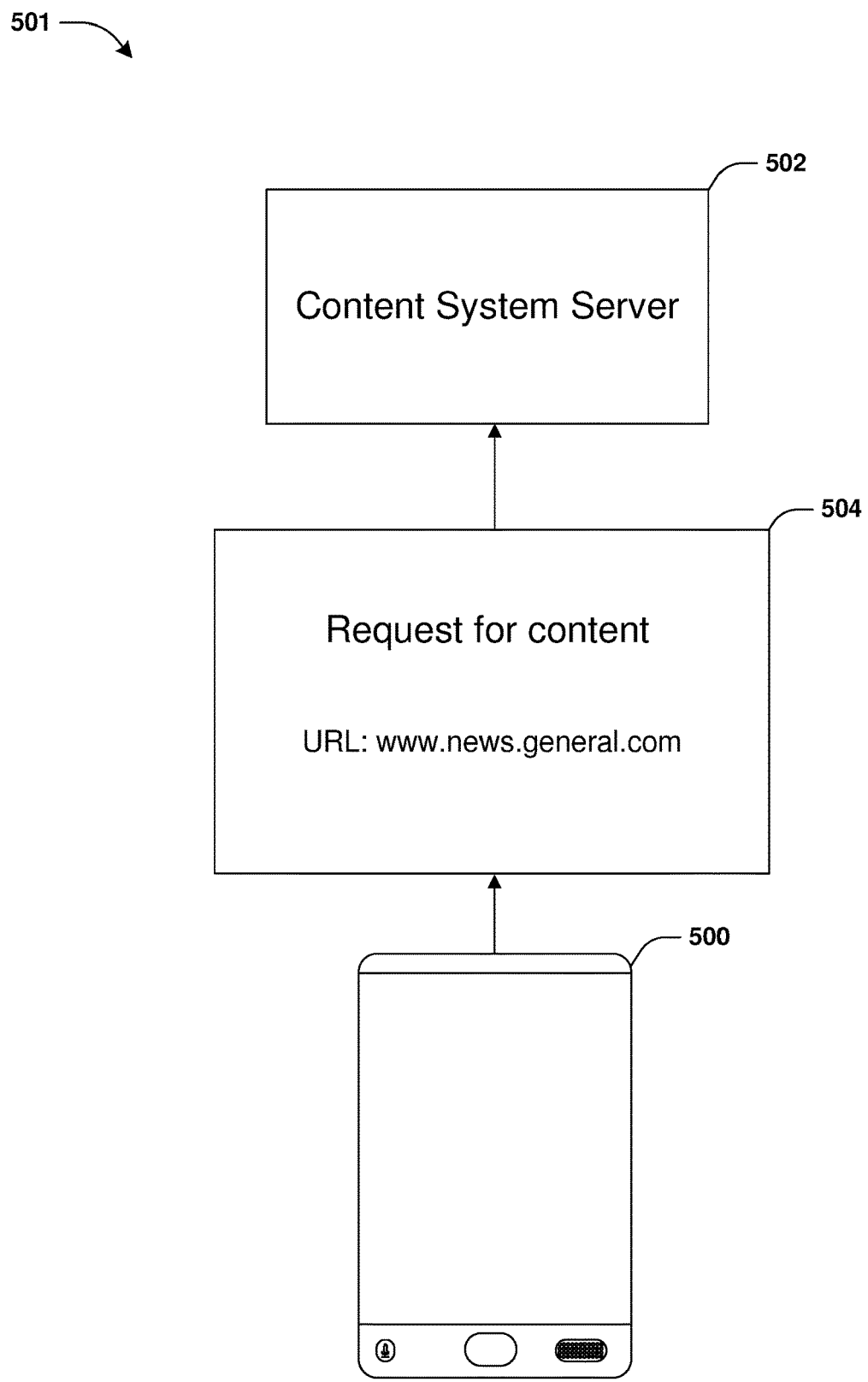
FIG. 5A is a component block diagram illustrating an example system for ranking content items, where a request for content is transmitted by a first client device.

FIGS. 5A-5L illustrate examples of a system 501 for ranking content items, described with respect to the method 400 of FIG. 4. FIG. 5A illustrates transmission of the request for content (shown with reference number 504) by the first client device (shown with reference number 500). The request for content 504 may be received by a server 502 associated with the content system. The request for content 504 may comprise an indication of a web address (e.g., a uniform resource locator (URL) comprising "www.news-.general.com") of the first internet resource. In an example, the first internet resource may correspond to a news platform that enables a first user of the first client device 500 to access and/or consume news articles. Other examples of the first internet resource are within the scope of the present disclosure. For example, the first internet resource may correspond to at least one of a video platform (e.g., for consuming videos, such as movies, documentaries, video clips, etc.), an audio platform (e.g., for consuming audio, such as songs, podcasts, etc.), a shopping platform (e.g., for consuming product pages and/or purchasing products), an online dating platform (e.g., for viewing dating profiles and/or communicating with other users), a social media platform (e.g., for viewing and/or posting social media posts, viewing social media profiles, and/or communicating with other users), a blog (e.g., for viewing and/or posting blog posts, etc.

At 404, a first plurality of content items may be identified (by the content system, for example). For example, the first plurality of content items may be identified in response to receiving the request for content 504. The content system may analyze a content item data store (e.g., a database of content items) to identify and/or extract the first plurality of content items. The first plurality of content items may comprise N content items (retrieved from the content item data store). In an example in which the first plurality of content items comprises news articles, the news articles may be retrieved from a news pool.

At 406, a first content item score profile associated with the first plurality of content items may be determined (by the content system, for example) using a content scoring model. The first content item score profile may comprise a first plurality of content item scores associated with the first plurality of content items. In some examples, the content scoring model may comprise a first machine learning model. The first machine learning model may, for example, comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc.

In some examples, the first plurality of content item scores may be determined based upon a first plurality of vector representations associated with the first plurality of content items. Each vector representation of the first plurality of vector representations may correspond to a representation (e.g., an embedding based representation) of a content item of the first plurality of content items. For example, a first vector representation of the first plurality of vector representations may correspond to a representation of a first content item of the first plurality of content items. A first content item score (associated with the first content item) of the first plurality of content item scores may be determined (using the content scoring model, for example) based upon the first vector representation associated with the first content item. The first vector representation may comprise an n-dimensional vector (e.g., the first vector representation may comprise a vector having n dimensions). The first vector representation may be indicative of (and/or may be generated based upon) features associated with the first content item. The features may comprise entities associated with the first content item, such as one or more topics, one or more subjects, etc. that are expressed, discussed, etc. in the first content item (e.g., the one or more entities may be indicative of people, places, organizations, etc. discussed in the first content item).

Alternatively and/or additionally, the first plurality of content item scores may be determined based upon a user profile associated with the first user of the first client device 500. The user profile may be generated based upon activity (e.g., internet activity) of the first user and/or the first client device 500. The user profile may comprise at least one of user interest information, activity information (e.g., activity information associated with at least one of the first client device 500, the first user, a user identifier associated with the first client device 500 and/or the first user, etc.), user demographic information (e.g., user demographic information associated with at least one of the first client device 500, the first user, the user identifier, etc.), location information (e.g., location information associated with at least one of the first client device 500, the first user, the user identifier, etc.), client information associated with the first client device 500 and/or the first user, etc. In some examples, the user interest information in the user profile is indicative of one or more entities in which the first user of the first client device 500 is determined to have an interest. For example, the one or more entities may comprise one or more topics, one or more subjects, etc. that are expressed, discussed, etc. in content that the first user accessed and/or consumed.

In an example, the first content item score associated with the first content item may be determined based upon the first vector representation and the user profile. The first content item score may correspond to a click probability associated with the first content item. For example, the click probability may correspond to a probability of receiving a selection (e.g., a click) of a selectable object associated with the first content item in response to presenting the selectable object on the first client device 500 (e.g., the selectable object may comprise a link to access the first content item). Accordingly, a higher value of the first content item score may be reflective of a higher likelihood that the first user of the first client device 500 is interested in accessing the first content item.

Other content item scores of the first plurality of content item scores (other than the first content item score) may be determined using one or more of the techniques provided herein with respect to determining the first content item score.

Figure 5B:
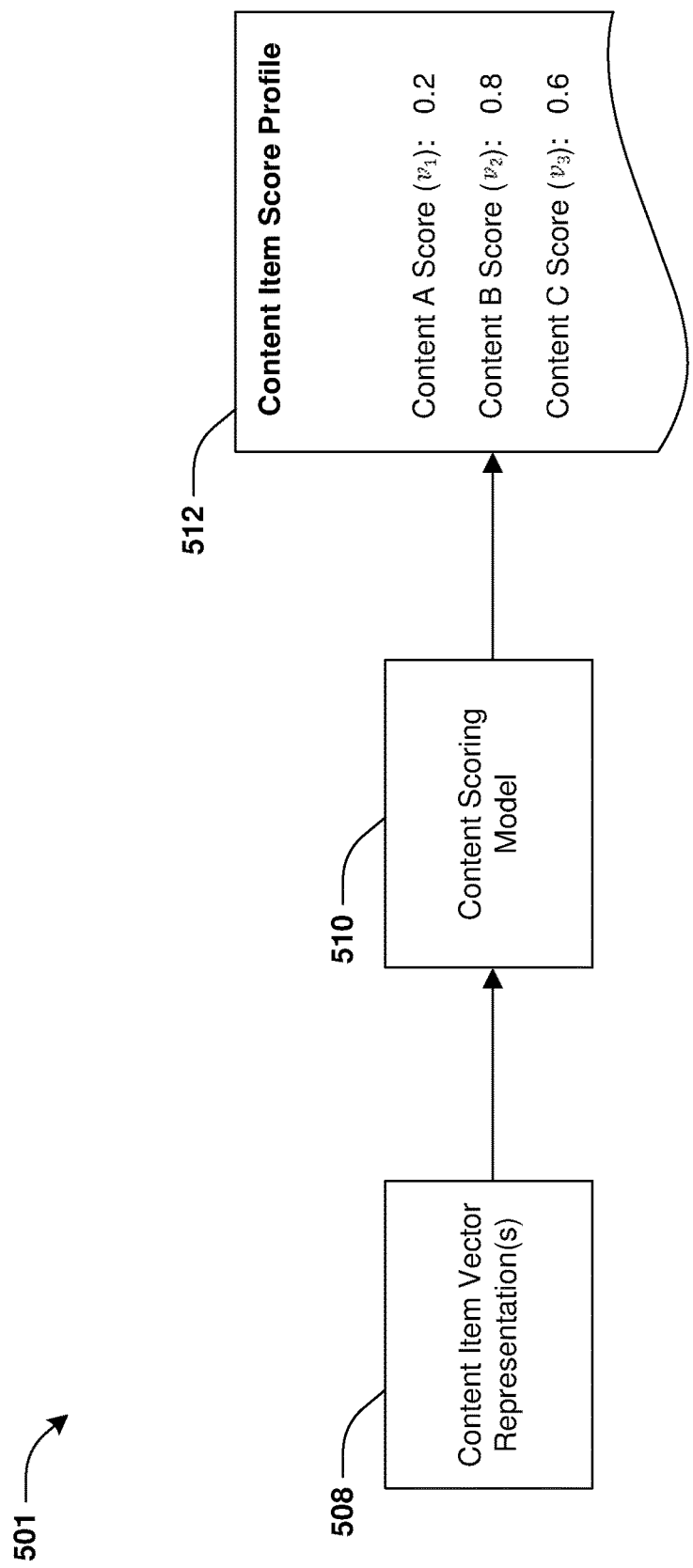
FIG. 5B is a component block diagram illustrating an example system for ranking content items, where a first content item score profile is determined using a content scoring model.

FIG. 5B illustrates determination of the first content item score profile (shown with reference number 512) using the content scoring model (shown with reference number 510). In some examples, the first plurality of vector representations (shown with reference number 508) may be input to the content scoring model 510, which may use the first plurality of vector representations 508 to determine the first plurality of content item scores of the first content item score profile 512.

In the example shown in FIG. 5B, the first plurality of content item scores of the first content item score profile 512 may comprise the first content item score (e.g., 0.2) associated with the first content item (e.g., "Content A" in FIG. 5B), a second content item score (e.g., 0.8) associated with a second content item (e.g., "Content B" in FIG. 5B) of the first plurality of content items, and/or a third content item score (e.g., 0.6) associated with a third content item (e.g., "Content C" in FIG. 5B) of the first plurality of content items. The first content item score profile 512 may correspond to a first vector V (e.g., a vector output by the content scoring model 510) comprising the first plurality of content item scores. A content item score of the first content item score profile 512 may be represented by $v_i$, wherein i may correspond to a content item (of the first plurality of content items) and may be an integer ranging from 1 to N. N may correspond to a quantity of content item scores of the first plurality of content item scores (which may be equal to a quantity of content items of the first plurality of content items).

At 408, a ranked list (hereinafter referred to as "determined ranked list") may be generated (by the content system, for example) using an exploration model. The determined ranked list may be generated based upon the first plurality of content item scores of the first content item score profile 512. The determined ranked list may be indicative of rankings of the first plurality of content items. In some examples, the exploration model may comprise a second machine learning model. The second machine learning model may, for example, comprise at least one of a neural network, a tree-based model, a machine learning model used to perform linear regression, a machine learning model used to perform logistic regression, a decision tree model, a SVM, a Bayesian network model, a k-NN model, a K-Means model, a random forest model, a machine learning model used to perform dimensional reduction, a machine learning model used to perform gradient boosting, etc. In an example, the exploration model (e.g., the second machine learning model) comprises a Plackett-Luce (PL) model.

In some examples, the exploration model is used to generate a first plurality of ranked lists, and the determined ranked list is selected from the first plurality of ranked lists. Alternatively and/or additionally, the exploration model may be used to generate merely the determined ranked list for the first plurality of content items (e.g., merely a single ranked list, comprising the determined ranked list, may be explored using the exploration model). The first plurality of ranked lists may be generated based upon the first plurality of content item scores of the first content item score profile 512. Each ranked list of the first plurality of ranked lists may be indicative of a unique set of rankings of the first plurality of content items.

Figure 5C:
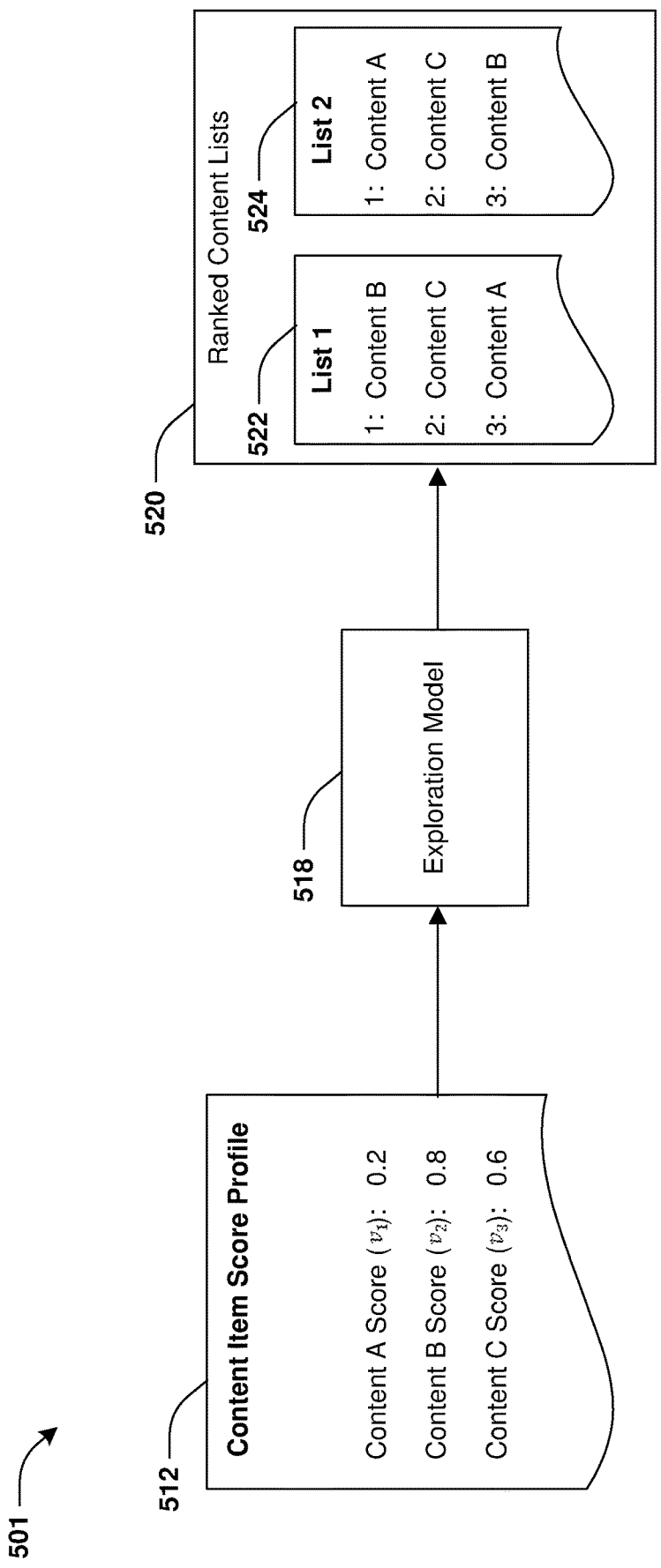
FIG. 5C is a component block diagram illustrating an example system for ranking content items, where a first plurality of ranked lists is determined using an exploration model.

FIG. 5C illustrates determination of the first plurality of ranked lists (shown with reference number 520) using the exploration model (shown with reference number 518). In some examples, the first content item score profile 512 may be input to the exploration model 518, which may use the first content item score profile 512 to generate the first plurality of ranked lists 520. The first plurality of ranked lists 520 may comprise a first ranked list 522 (e.g., "List 1" in FIG. 5C), a second ranked list 524 (e.g., "List 2" in FIG. 5C) and/or one or more other ranked lists comprising rankings of the first plurality of content items.

Rankings of the first ranked list 522 may be different than rankings of the second ranked list 524. For example, the first ranked list 522 may indicate a ranking of 1 (e.g., highest ranking) for the second content item (e.g., "Content B"), a ranking of 2 (e.g., second-to-highest ranking) for the third content item (e.g., "Content C"), and/or a ranking of 3 for the first content item (e.g., "Content A"). The second ranked list 524 may indicate a ranking of 1 for the first content item (e.g., "Content A"), a ranking of 2 for the third content item (e.g., "Content C"), and/or a ranking of 3 for the second content item (e.g., "Content B").

In some examples, the exploration model 518 may determine a first probability profile based upon the first content item score profile 512. The exploration model 518 may generate the determined ranked list (and/or the first plurality of ranked lists 520 comprising the determined ranked list) based upon the first probability profile. In some examples, the first probability profile may comprise a first plurality of probabilities associated with the first plurality of content items. In an example, the first probability profile may correspond to a second vector P. A probability of the first plurality of probabilities may be represented by $p_i$, wherein i may correspond to a content item (of the first plurality of content items) and may be an integer ranging from 1 to N (e.g., a quantity of probabilities of the first plurality of probabilities may be equal to N, which is equal to the quantity of content item scores of the first plurality of content item scores). A probability $p_i$ associated with a content item i may be determined based upon the first content item score profile 512. In some examples, the probability $p_i$ associated with the content item i may be a function of a content item score $v_i$ (of the first content item score profile 512) associated with the content item i, wherein a higher value of the content item score $v_i$ corresponds to a higher value of the probability $p_i$. In some examples, the first plurality of probabilities may be generated to have a sum equal to 1.

In an example, the first plurality of probabilities may correspond to a multinomial distribution of the first plurality of content item scores of the first content item score profile 512. For example, a probability $p_i$ of the first plurality of probabilities may correspond to (e.g., may be equal to and/or may be based upon) $e^{v_i}/\sum_{j=1}^{N}e^{v_j}$.

Figure 5D:
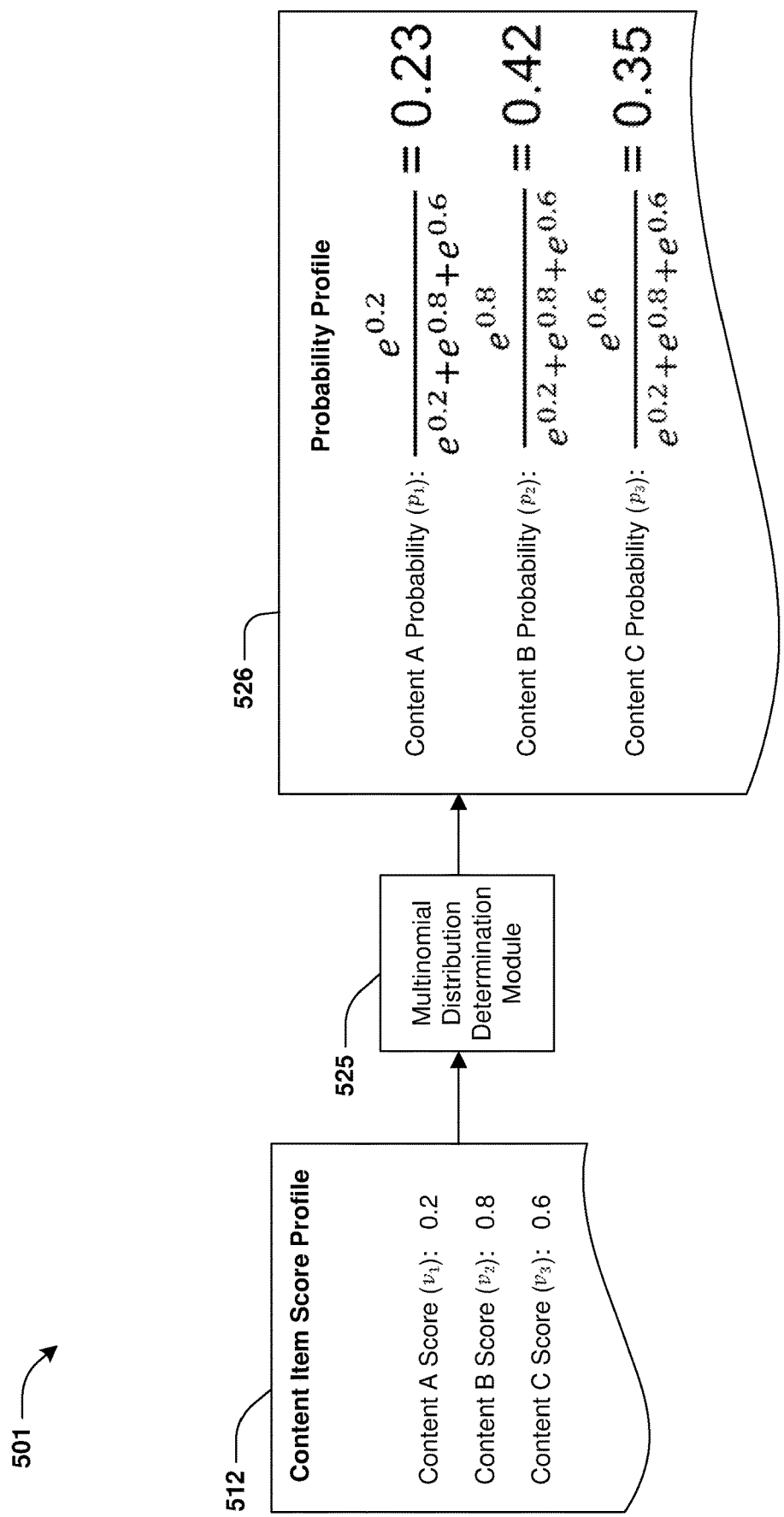
FIG. 5D is a component block diagram illustrating an example system for ranking content items, where a first probability profile is determined.

FIG. 5D illustrates determination of the first probability profile (shown with reference number 526) according to an example in which the quantity of content items of the first plurality of content items is 3 (e.g., N is equal to 3). In FIG. 5D, the first content item score (associated with the first content item) may be equal to 0.2, the second content item score (associated with the second content item) may be equal to 0.8, and/or the third content item score (associated with the third content item) may be equal to 0.6. The first content item score profile 512 may be input to a multinomial distribution determination module 525, which may use the first content item score profile 512 to generate the first probability profile 526 comprising a first probability associated with the first content item, a second probability associated with the second content item and/or a third probability associated with the third content item. The exploration model 518 may comprise the multinomial distribution determination module 525. The first probability may be determined to be equal to $$\frac{e^{v_1}}{e^{v_1}+e^{v_2}+e^{v_3}} = \frac{e^{0.2}}{e^{0.2}+e^{0.8}+e^{0.6}} = 0.23.$$

The second content item score associated with the second content item may be determined to be equal to $$\frac{e^{v_2}}{e^{v_1}+e^{v_2}+e^{v_3}} = \frac{e^{0.8}}{e^{0.2}+e^{0.8}+e^{0.6}} = 0.42.$$

The third content item score associated with the third content item may be determined to be equal to $$\frac{e^{v_3}}{e^{v_1}+e^{v_2}+e^{v_3}} = \frac{e^{0.6}}{e^{0.2}+e^{0.8}+e^{0.6}} = 0.35.$$

In some examples, the determined ranked list may be generated via an iterative sampling process associated with iteratively sampling content items from the first plurality of content items. For example, the exploration model 518 may perform a plurality of sampling iterations to generate the determined ranked list. A sampling iteration of the plurality of sampling iterations may be associated with a ranking (e.g., 1, 2, 3, etc.) and/or may comprise sampling a content item (from the first plurality of content items) for the ranking. In an example, the plurality of sampling iterations may be performed in order of highest ranking (e.g., 1) to lowest ranking (e.g., N). For example, a first (e.g., initial) sampling iteration of the plurality of sampling iterations may be associated with the highest ranking (e.g., 1), a second sampling iteration (e.g., subsequent to the first sampling iteration) of the plurality of sampling iterations may be associated with a second-highest ranking (e.g., 2), etc. Accordingly, the determined ranked list may indicate the highest ranking for a content item sampled in the first sampling iteration, the second-highest ranking for a content item sampled in the second sampling iteration, etc.

In some examples, a sampling iteration of the iterative sampling process may comprise sampling (e.g., probability-based sampling) a content item according to the first probability profile 526. For example, a probability (associated with the content item) indicated by the first probability profile 526 may correspond to a probability that the content item is sampled in the sampling iteration.

In some examples, in the iterative sampling process (performed to generate the determined ranked list), each content item may be sampled at most once (to prevent assigning multiple rankings to the same content item in the determined ranked list, for example). Accordingly, each sampling iteration of the plurality of sampling iterations may reduce a quantity of content items in a content item pool from which to sample in the iterative sampling process. For example, after sampling a content item in a sampling iteration, the content item may be removed from the content item pool (such that the content item is not sampled in a subsequent sampling iteration to avoid multiple rankings being assigned to the same content item in the determined ranked list, for example).

Due to the decreasing size of the content item pool over sampling iterations of the iterative sampling process, a probability that a content item is sampled may be different over different sampling iterations. For example, the probability may be higher when the content item pool is smaller (e.g., since there are fewer content items to sample). Accordingly, the first probability profile 526 may be updated during the iterative sampling process. For example, in response to performing a sampling iteration in which a content item is sampled, the first content item score profile 512 (e.g., the first vector V) and/or the first probability profile 526 (e.g., the second vector P) may be updated to reflect that the content item (sampled in the sampling iteration) cannot be sampled in a subsequent sampling iteration (e.g., thereby increasing the probability that another content item is selected in the subsequent sampling iteration). In an example, updating the first content item score profile 512 may comprise removing, from the first content item score profile 512 (e.g., the first vector V), a content item score of the content item that was sampled in the sampling iteration. Thus, updating the first content item score profile 512 may generate an updated version of the first content item score profile 512 without the content item score of the (sampled) content item. Updating the first probability profile 526 may comprise updating probabilities (in the first probability profile 526) of remaining content items in the content item pool (e.g., the remaining content items may comprise content items, in the content item pool, other than the content item that was sampled in the sampling iteration) based upon remaining content item scores in the updated version of the first content item score profile 512 (e.g., the first vector V). Accordingly, updating the first probability profile 526 may generate an updated version of the first probability profile 526 with updated probabilities associated with the remaining content items in the content item pool.

Figure 5E:
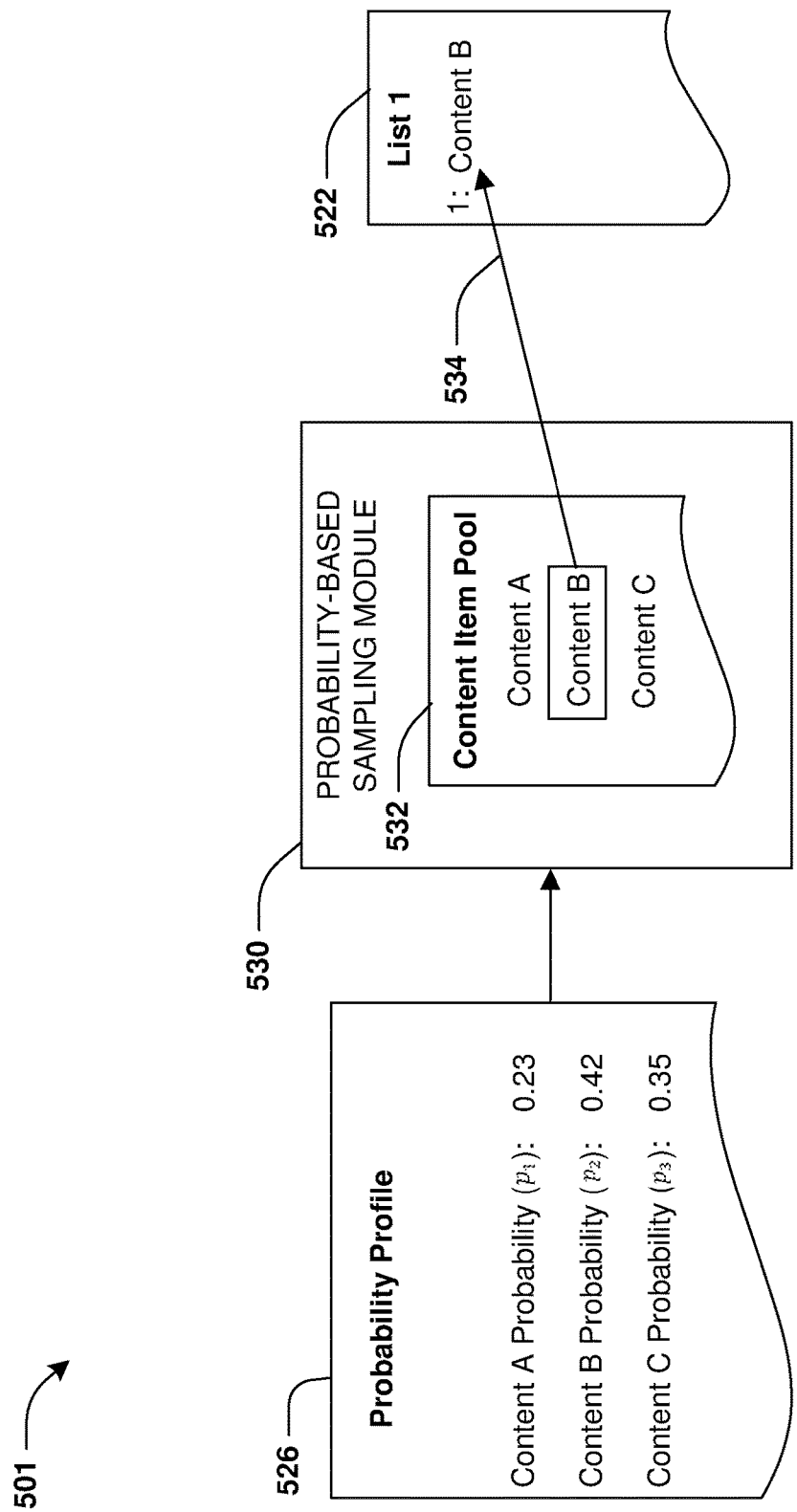
FIG. 5E is a component block diagram illustrating an example system for ranking content items, where a first sampling iteration of a first iterative sampling process is performed.
Figure 5F:
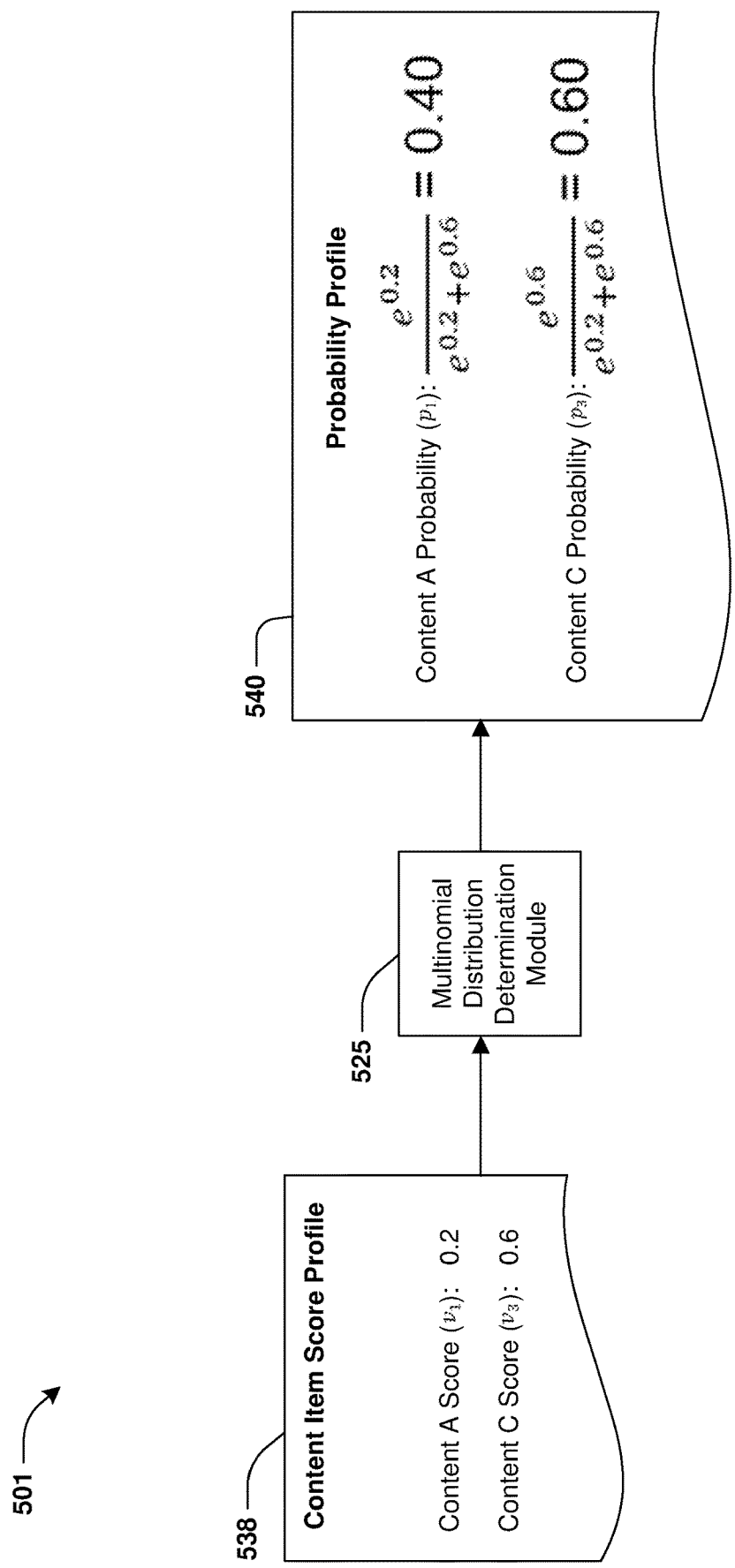
FIG. 5F is a component block diagram illustrating an example system for ranking content items, where a first content item score profile and/or a first probability profile are updated in response to sampling a second content item in a first sampling iteration.
Figure 5G:
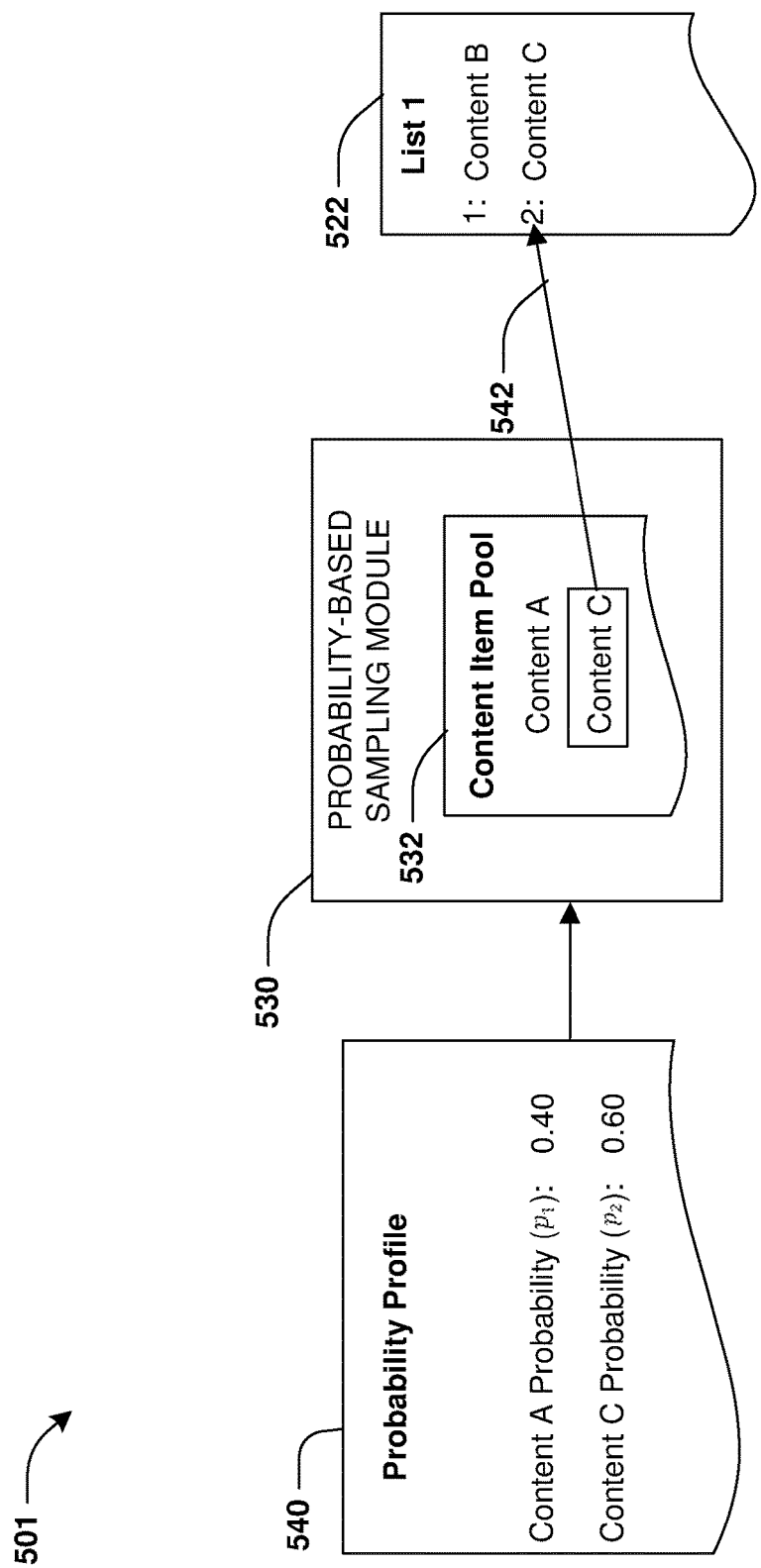
FIG. 5G is a component block diagram illustrating an example system for ranking content items, where a second sampling iteration of a first iterative sampling process is performed.

FIGS. 5E-5G illustrate an example associated with a first iterative sampling process performed generate the first ranked list 522 (e.g., the determined ranked list), according to an example in which the first plurality of content items comprises three content items (e.g., N is equal to 3).

FIG. 5E illustrates performing a first (e.g., initial) sampling iteration of the first iterative sampling process. The first sampling iteration may be performed using a probability-based sampling module 530 based upon the first probability profile 526. The exploration model 518 may comprise the probability-based sampling module 530. The probability-based sampling module 530 may perform probability-based sampling to sample a content item in the content item pool (shown with reference number 532) according to probabilities indicated by the first probability profile 526. In the example shown in FIG. 5E, the first probability profile 526 indicates a probability of 0.23 for the first content item (e.g., "Content A"), a probability of 0.42 for the second content item (e.g., "Content B") and/or a probability of 0.35 for the third content item (e.g., "Content C"). Accordingly, in the first sampling iteration: (i) a probability that the first content item is sampled in the first sampling iteration may be 0.23 (e.g., there is a 23% likelihood that the first content item is sampled in the first sampling iteration), (ii) a probability that the second content item is sampled in the first sampling iteration may be 0.42, and/or (iii) a probability that the third content item is sampled in the first sampling iteration may be 0.35. Accordingly, since the second content item is associated with a higher probability (e.g., 0.42) than the first content item (e.g., the probability of 0.23), a likelihood that the second content item is sampled in the first sampling iteration is higher than a likelihood that the first content item is sampled in the first sampling iteration. However, even though the second content item is associated with the higher probability, there is still a possibility that the first content item is sampled in the first sampling iteration (due to the probability-based sampling module 530 performing probability-based sampling, for example). The first sampling iteration may be associated with the highest ranking (e.g., 1) of the first ranked list 522 (e.g., a content item sampled in the first sampling iteration is assigned the highest ranking in the first ranked list 522). In the example shown in FIG. 5E, the probability-based sampling module 530 may sample 534 the second content item. Accordingly, the second content item may be included, in the first ranked list 522, with the highest ranking (e.g., 1). The second content item may be removed from the content item pool 532 in response to sampling the second content item in the first sampling iteration.

FIG. 5F illustrates updating the first content item score profile 512 and/or the first probability profile 526 in response to sampling 534 the second content item in the first sampling iteration. For example, the second content item score associated with the second content item may be removed from the first content item score profile 512 to generate a first updated version 538 (shown in FIG. 5F) of the first content item score profile (e.g., the first vector V) without the second content item score (e.g., $v_2$). The first probability profile 526 (e.g., the second vector P) may be updated based upon the first updated version 538 of the first content item score profile. For example, probabilities associated with remaining content items (e.g., content items that are not yet sampled in the first iterative sampling process) may be determined based upon content item scores (associated with the remaining content items) in the first updated version 538 of the first content item score profile. The probabilities may correspond to a multinomial distribution of content item scores in the first updated version 538 of the first content item score profile. The probabilities may be determined using the multinomial distribution determination module 525.

In the example shown in FIG. 5F, the first updated version 538 of the first content item score profile comprises the first content item score associated with the first content item and the second content item score associated with the second content item. Accordingly, updated probabilities associated with the first content item and/or the second content item may be determined (using the multinomial distribution determination module 525, for example) based upon the first content item score associated with the first content item and the second content item score associated with the second content item. The first probability profile 526 may be updated to generate a first updated version 540 of the first probability profile comprising the updated probabilities. In an example, the first updated version 540 of the first probability profile comprises (i) a probability of 0.40

$$\left(e.g., \frac{e^{v_1}}{e^{v_1} + e^{v_3}} = \frac{e^{0.2}}{e^{0.2} + e^{0.6}} = 0.40\right)$$

for the first content item, and/or (ii) a probability of 0.60

$$\left(e.g., \frac{e^{v_3}}{e^{v_1} + e^{v_3}} = \frac{e^{0.6}}{e^{0.2} + e^{0.6}} = 0.60\right)$$

for the third content item.

FIG. 5G illustrates performing a second sampling iteration of the first iterative sampling process. The second sampling iteration may be subsequent to the first iterative sampling process, and there may be no other sampling iteration of the first iterative sampling process between the first sampling iteration and the second sampling iteration. The second sampling iteration may be performed based upon the first updated version 540 of the first probability profile. For example, the probability-based sampling module 530 may perform probability-based sampling to sample a content item in the content item pool 532 according to probabilities indicated by the first probability profile 526. In some examples, the content item pool 532 (from which to sample) no longer includes the second content item (as shown in FIG. 5G) since the second content item was sampled 534 in the first sampling iteration (shown in FIG. 5E). According to the first updated version 540 of the first probability profile shown in FIG. 5G, in the second sampling iteration: (i) a probability that the first content item is sampled in the second sampling iteration is 0.40, and/or (ii) a probability that the third content item is sampled in the second sampling iteration is 0.60. The second sampling iteration may be associated with the second-highest ranking (e.g., 2) of the first ranked list 522 (e.g., a content item sampled in the second sampling iteration is assigned the second-highest ranking in the first ranked list 522). The probability-based sampling module 530 may sample 542 the third content item. Accordingly, the third content item may be included, in the first ranked list 522, with the second-highest ranking (e.g., 2).

The third content item may be removed from the content item pool 532 in response to sampling the third content item in the second sampling iteration. In some examples, in response to performing the second sampling iteration, a third sampling iteration of the first iterative sampling process may be performed to sample a content item from the content item pool 532. In some examples, the third sampling iteration may comprise sampling the first content item (since the first content item is the only remaining content item in the content item pool 532, for example). Accordingly, the first content item may be included, in the first ranked list 522, with a lowest ranking of the first ranked list 522 (shown in FIG. 5C). In some examples, sampling iterations (e.g., the first sampling iteration, the second sampling iteration, etc.) of the first iterative sampling process may be performed until (i) all content items of the content item pool 532 are sampled and included in the first ranked list 522 and/or (ii) a threshold quantity of content items are sampled and included in the first ranked list 522.

In an example in which the first plurality of ranked lists 520 is generated using the exploration model 518 (and the determined ranked list is selected from the first plurality of ranked lists 520, for example), one or more other ranked lists (e.g., the second ranked list 524) of the first plurality of ranked lists 520 may be generated using one or more of the techniques provided herein with respect to generating the first ranked list 522. For example, a second iterative sampling process may be performed to generate the second ranked list 524. The second iterative sampling process may be performed using one or more of the techniques provided herein with respect to the first iterative sampling process. It may be appreciated that content item rankings of the second ranked list 524 may be different than content item rankings of the first ranked list 522, such as due, at least in part to the first iterative sampling process and/or the second iterative sampling process employing probability-based sampling to sample content items.

In an example in which the first plurality of ranked lists 520 is generated using the exploration model 518 (and the determined ranked list is selected from the first plurality of ranked lists 520, for example), a first plurality of list scores may be generated (by the content system, for example) based upon the first plurality of ranked lists 520. In some examples, the first plurality of list scores may comprise a list score for each ranked list of the first plurality of ranked lists 520. For example, the first plurality of list scores may comprise a first list score associated with the first ranked list 522, a second list score associated with the second ranked list 524, and/or one or more other list scores associated with one or more other ranked lists of the first plurality of ranked lists 520.

Figure 5H:
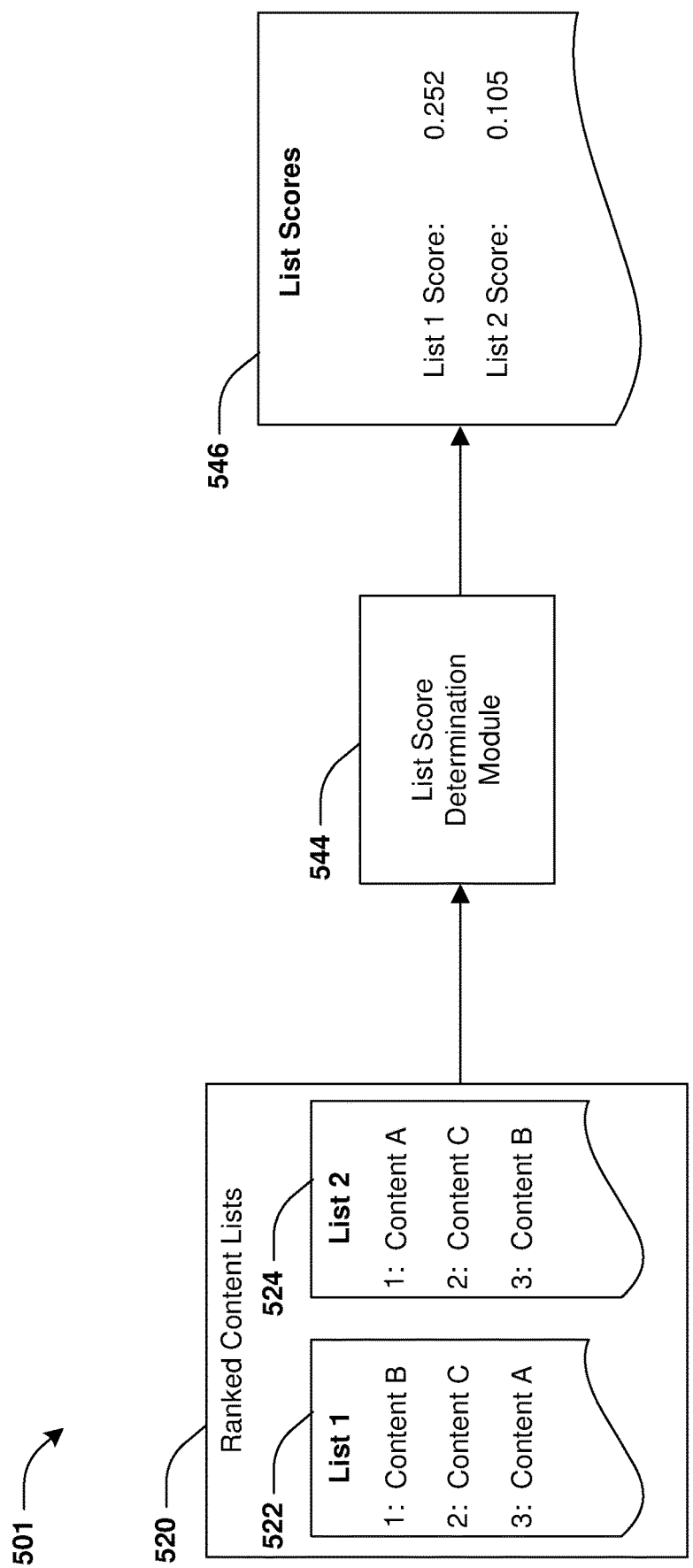
FIG. 5H is a component block diagram illustrating an example system for ranking content items, where a first plurality of list scores associated with a first plurality of ranked lists is generated.

FIG. 5H illustrates generation of the first plurality of list scores (shown with reference number 546) associated with the first plurality of ranked lists 520 (according to an example in which the first plurality of ranked lists 520 is generated using the exploration model 518). The first plurality of ranked lists 520 may be input to a list score determination module 544, which may generate the first plurality of list scores 546 based upon the first plurality of ranked lists 520. Alternatively and/or additionally, the first plurality of list scores 546 may be generated based upon the first plurality of content item scores of the first content item score profile 512. For example, a list score (of the first plurality of list scores 546) associated with a ranked list (of the first plurality of ranked lists 520) may be a function of (i) rankings, of content items, indicated by the ranked list, and/or (ii) content item scores of the content items. For example, the list score may correspond to (e.g., may be equal to and/or may be based upon) $\prod_{i=1}^{N}[e^{v_{\xi(i)}}/(e^{v_{\xi(i)}}+e^{v_{\xi(i+1)}}+\ldots+e^{v_{\xi(N)}})]$, wherein (i) $\xi(i)$ may correspond to a content item associated with a ranking i, and/or (ii) $v_{\xi(i)}$ may correspond to a content item score (of the content item associated with the ranking i) indicated by the first content item score profile 512. In some examples, the list score may be higher when content items associated with higher content item scores have higher rankings in the ranked list than when content items associated with higher content item scores have lower rankings in the ranked list.

In an example, the first list score (e.g., "List 1 Score" in FIG. 5H) may be determined based upon the first ranked list 522 and/or the first plurality of content item scores. The second list score (e.g., "List 2 Score" in FIG. 5H) may be determined based upon the second ranked list 524 and/or the first plurality of content item scores. The first list score associated with the first ranked list 522 may be determined to be equal to $$\prod_{i=1}^{N} [e^{v_{\xi(i)}} / (e^{v_{\xi(i)}} + e^{v_{\xi(i+1)}} + \ldots + e^{v_{\xi(N)}})] =$$

$$\frac{e^{0.8}}{e^{0.8} + e^{0.6} + e^{0.2}} \cdot \frac{e^{0.6}}{e^{0.6} + e^{0.2}} \cdot \frac{e^{0.2}}{e^{0.2}} = 0.253.$$

The second list score associated with the second ranked list 524 may be determined to be equal to $$\prod_{i=1}^{N} [e^{v_{\xi(i)}} / (e^{v_{\xi(i)}} + e^{v_{\xi(i+1)}} + \cdots + e^{v_{\xi(N)}})] =$$

$$\frac{e^{0.2}}{e^{0.2} + e^{0.6} + e^{0.8}} \cdot \frac{e^{0.6}}{e^{0.6} + e^{0.8}} \cdot \frac{e^{0.8}}{e^{0.8}} = 0.104.$$

In an example in which the first plurality of ranked lists 520 is generated using the exploration model 518 (and the determined ranked list is selected from the first plurality of ranked lists 520, for example), the determined ranked list may be selected (by the content system, for example) from the first plurality of ranked lists 520 based upon the first plurality of list scores 546. In the example, the determined ranked list may be selected based upon a determination that a content item score associated with the determined ranked list is a highest content item score among the first plurality of list scores 546.

Alternatively and/or additionally, in an example in which the first plurality of ranked lists 520 is generated using the exploration model 518 (and the determined ranked list is selected from the first plurality of ranked lists 520, for example), the determined ranked list may be selected via performing probability-based selection based upon a first plurality of list probabilities associated with the first plurality of ranked lists 520. The first plurality of list probabilities may comprise a list probability for each ranked list of the first plurality of ranked lists 520. For example, the first plurality of list probabilities may comprise a first list probability associated with the first ranked list 522, a second list probability associated with the second ranked list 524, and/or one or more other list probabilities associated with one or more other ranked lists of the first plurality of ranked lists 520. The first plurality of list probabilities may be based upon (and/or may be equal to) the first plurality of list scores 546. For example, the first list probability associated with the first ranked list 522 may be determined based upon the first list score, and/or the second list probability associated with the second ranked list 524 may be determined based upon the second list score. In some examples, the first list probability may be a function of the first list score, wherein a higher value of the first list score corresponds to a higher value of the first list probability. In some examples, the first plurality of list probabilities may be generated to have a sum equal to 1.

In an example, the first plurality of list probabilities may correspond to a multinomial distribution of the first plurality of list scores 546. The first plurality of list probabilities may be determined based upon the first plurality of list scores 546 using one or more of the techniques provided herein with respect to determining the first plurality of probabilities (of the first probability profile 526) based upon the first plurality of content item scores of the first content item score profile 512.

In an example in which the first plurality of list scores 546 comprises the first list score equal to 0.252 and/or the second list score equal to 0.105 (such as shown in FIG. 5H), the first list probability associated with the first ranked list 522 may be determined to be equal to $$\frac{e^{0.252}}{e^{0.252} + e^{0.105}} = 0.537.$$

The second list probability associated with the second ranked list 524 may be determined to be equal to $$\frac{e^{0.105}}{e^{0.105} + e^{0.252}} = 0.463.$$

Accordingly, a probability that the first ranked list 522 is selected at act 412 of FIG. 4 may be 0.537 and/or a probability that the second ranked list 524 is selected at act 412 may be 0.463. Thus, since the first ranked list 522 is associated with a higher list probability (e.g., 0.537) than the second ranked list 524 (e.g., the probability of 0.463), a likelihood that the first ranked list 522 is selected at act 412 is higher than a likelihood that the second ranked list 524 is selected. However, even though the first ranked list 522 is associated with the higher list probability, there is still a possibility that the second ranked list 524 is selected at act 412 (due to the determined ranked list being selected via performing probability-based selection, for example).

In some examples, generation of the first plurality of list scores 546 and/or selection of the determined ranked list may be performed using the exploration model 518.

At 410, the first content item selection interface may be generated (by the content system, for example) based upon the determined ranked list (e.g., the first ranked list 522, the second ranked list 524, or other ranked list). The first content item selection interface may comprise a plurality of selectable objects corresponding to content items of the first plurality of content items. For example, a selectable object of the plurality of selectable objects may comprise at least one of a link to a content item (e.g., a link to an internet resource, such as a web page, that provides the content item), a graphical object associated with the content item (e.g., at least one of an image, a picture, a symbol, etc. representative of the content item), a summary of the content item, a preview of at least a portion of the content item, a title of the content item, etc. The plurality of selectable objects may be arranged (e.g., ordered, positioned, etc.) according to rankings indicated by the determined ranked list.

The plurality of selectable objects may comprise a selectable object for each content item of the first plurality of content items. In an example in which the first plurality of content items comprises the first content item, the second content item and the third content item, the plurality of selectable objects may comprise a first selectable object associated with the first content item (e.g., the first content item may be accessed and/or presented in response to a selection of the first selectable object), a second selectable object associated with the second content item (e.g., the second content item may be accessed and/or presented in response to a selection of the second selectable object), and a third selectable object associated with the third content item (e.g., the third content item may be accessed and/or presented in response to a selection of the third selectable object).

Alternatively and/or additionally, a quantity of selectable objects, Q, of the plurality of selectable objects may be lower than the quantity of content items, N, of the first plurality of content items. In an example in which Q is lower than N, the plurality of selectable objects may comprise a selectable object for each content item of a subset of content items selected from the first plurality of content items. For example, the subset of content items associated with the plurality of selectable objects may comprise the Q highest ranked content items of the first plurality of content items according to the selected list (e.g., when Q is 10, the subset of content items may comprise the 10 highest ranked content items of the first plurality of content items).

In some examples, the first content item selection interface may be provided (by the content system, for example) for display on the first client device 500. For example, the first content item selection interface may be presented via the first internet resource. In an example, the first content item selection interface may be transmitted to the first client device 500 (and/or presented via the first internet resource) in response to the request for content 504. In an example, the first content item selection interface may be provided to the first client device 500 using a server hosting the first internet resource.

Figure 5I:
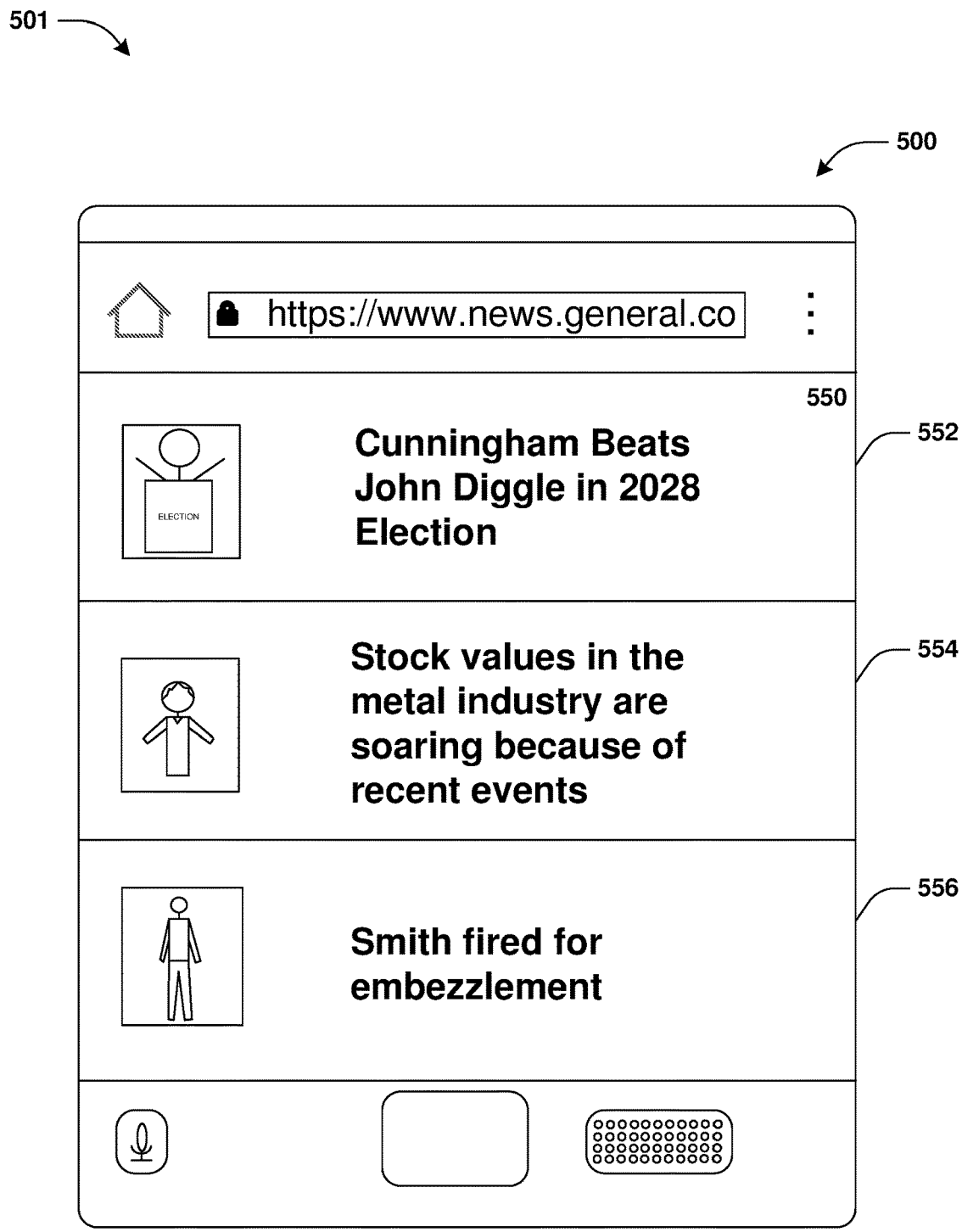
FIG. 5I is a component block diagram illustrating an example system for ranking content items, where a first content item selection interface is presented via a first client device.

FIG. 5I illustrates presentation of the first content item selection interface (shown with reference number 550) via the first client device 500. In an example, the determined ranked list (based upon which selectable objects of the first content item selection interface 550 are arranged) corresponds to the first ranked list 522 (shown in FIG. 5H) in which the second content item (e.g., "Content B") has the highest ranking, the third content item (e.g., "Content C) has the second-highest ranking, and/or the first content item (e.g., "Content A") has a third-highest ranking (e.g., lowest ranking when N is equal to 3). Accordingly, the plurality of selectable objects may be arranged such that the second selectable object (shown with reference number 552) associated with the second content item is at least one of higher, before, more prominent, etc. than the third selectable object (shown with reference number 554) associated with the third content item and/or the first selectable object (shown with reference number 556) associated with the first content item. In the example shown in FIG. 5I, according to the determined ranked list (e.g., the first ranked list 522), the second selectable object 552 may be positioned over the third selectable object 554, which may be positioned over the first selectable object 556.

In the example shown in FIG. 5I, the first content item selection interface 550 may correspond to a list of news items corresponding to links to news articles (e.g., news articles of a news platform associated with the first internet resource). Accordingly, in response to a selection of a selectable object in the first content item selection interface 550, a news article corresponding to the selectable object may be accessed and/or presented via the first client device 500. Other examples of the first content item selection interface 550 (and/or other types of content items that are accessed via the first content item selection interface 550) are within the scope of the present disclosure. For example, the first content item selection interface 550 may correspond to an interface for selecting at least one of videos, songs, podcasts, product pages (e.g., online shopping web pages for different products of a shopping platform), dating profiles, social media posts, social media profiles, blog posts, etc. (e.g., a selectable object in the first content item selection interface 550 may be selected to access at least one of a video, a song, a podcast, a product page, a dating profile, a social media post, a social media profile, a blog post, etc. associated with the selectable object).

In some examples, user activity associated with the first content item selection interface 550 may be identified and/or used (as feedback, for example) to modify (e.g., update, such as optimize and/or train) one or more components (e.g., at least one of the content scoring model 510, the exploration model 518, etc.) of the content system.

For example, a first user interaction profile indicative of one or more user interactions with the first content item selection interface 550 may be determined (by the content system, for example) based upon one or more signals (received after presenting the first content item selection interface 550 via the first client device 500, for example). The one or more signals may be received (by the content system, for example) from the first client device 500 and/or a server hosting the first internet resource. The one or more signals may be indicative of one or more interactions (e.g., clicks, impressions, likes, dislikes, etc.) of the first user of the first client device 500 with the first content item selection interface 550. For example, a signal of the one or more signals may be transmitted (by the first client device 500 and/or the server hosting the first internet resource, for example) to the content system in response to a selection (by the first user, for example) of a selectable object in the first content item selection interface 550 (e.g., the signal may be indicative of the selectable object that was selected).

Figure 5J:
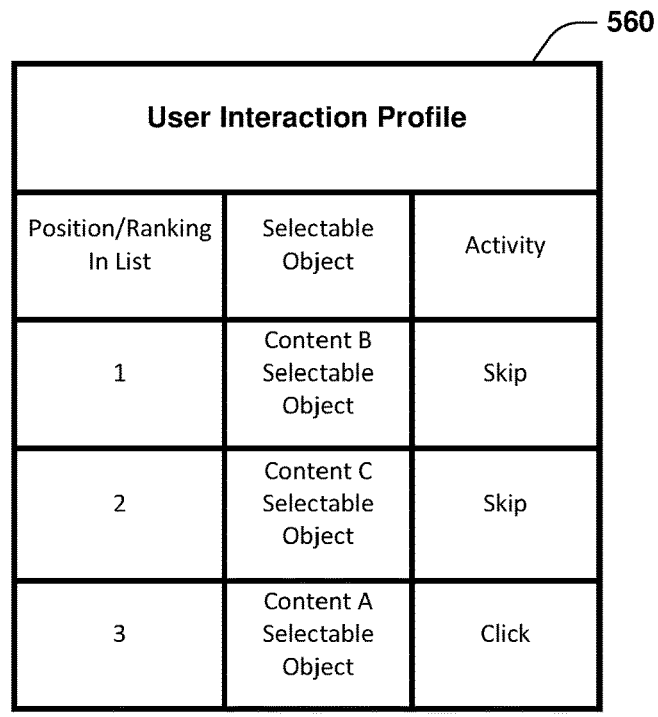
FIG. 5J illustrates a representation of a first user interaction profile.

FIG. 5J illustrates a representation 560 of the first user interaction profile. The first user interaction profile may be indicative of (i) one or more first selectable objects, of the plurality of selectable objects, selected by the first user of the first client device 500, and/or (ii) one or more second selectable objects, of the plurality of selectable objects, skipped by the first user (e.g., the one or more second selectable objects are not selected by the first user when the first content item selection interface 550 is presented on the first client device 500). In the example shown in FIG. 5J, the one or more first selectable objects may comprise the first selectable object 556 (associated with "Content A"), while the one or more second selectable objects may comprise the second selectable object 552 (associated with "Content B") and/or the third selectable object 554 (associated with "Content C"). Alternatively and/or additionally, the first user interaction profile may be indicative of rankings, indicated by the determined ranked list (according to which the plurality of selectable objects are arranged in the first content item selection interface 550), associated with the one or more first selectable objects and/or the one or more second selectable objects. In the example shown in FIG. 5J, the first user interaction profile may indicate that (i) the second selectable object 552 (associated with "Content B") is associated with the highest ranking (e.g., highest position) of the first content item selection interface 550 and is skipped by the first user, (ii) the third selectable object 554 (associated with "Content C") is associated with the second-highest ranking (e.g., second-highest position) of the first content item selection interface 550 and is skipped by the first user, and/or (iii) the first selectable object 556 (associated with "Content A") is associated with the third-highest ranking (e.g., third-highest position) of the first content item selection interface 550 and is selected (e.g., clicked) by the first user.

Alternatively and/or additionally, the first user interaction profile may comprise an event vector E comprising a plurality of event items associated with the plurality of selectable objects, wherein each item $e_i$ of the plurality of event items may be indicative of whether a corresponding selectable object associated with ranking i was selected or skipped by the first user of the first client device 500. The item $e_i$ may be a binary value (e.g., 1 or 0). For example, the item $e_i$ being equal to 1 may indicate that the corresponding selectable object was selected by the first user, whereas the item et being equal to 0 may indicate that the corresponding selectable object was skipped by the first user. Accordingly, with respect to the example shown in FIG. 5J, the event vector E may comprise [0, 0, 1] (indicating a skip associated with the highest ranking, a skip associated with the second-highest ranking, and a selection associated with the third-highest ranking, for example).

In some examples, a first interaction score may be determined based upon the first user interaction profile. In an example, the first interaction score may correspond to (e.g., may be equal to and/or may be based upon) a Discounted Cumulative Gain (DCG) metric associated with the first content item selection interface 550. In an example in which the first user interaction profile comprises the event vector E with event items $e_i$, the DCG metric may correspond to (e.g., may be equal to and/or may be based upon) $\sum_{i=1}^{N}(2^{e_i}-1)/(\log_2 i+1)$. Alternatively and/or additionally, the first interaction score may correspond to (e.g., may be equal to and/or may be based upon) a normalized Discounted Cumulative Gain (nDCG) metric determined based upon the DCG metric. For example, the nDCG metric may correspond to (e.g., may be equal to and/or may be based upon) a combination of the DCG metric and/or an ideal DCG (iDCG) associated with the first content item selection interface 550 (e.g., the iDCG may be equal to the DCG metric divided by the ideal DCG). The iDCG may correspond to a DCG metric of an ideal (e.g., optimal) scenario in which (i) one or more selectable objects associated with a (consecutive) set of one or more highest rankings of the determined ranked list are selected, (ii) there are zero skips of selectable objects that are associated with a ranking higher than any ranking of the set of one or more highest rankings. In an example, the iDCG may correspond to a DCG of an event vector comprising [1, 1, 1, 0, 0, 0] corresponding to a scenario in which (i) selectable objects associated with the highest three rankings of the determined ranked list are selected, and (ii) remaining selectable objects with lower rankings are skipped, which may be reflective of the plurality of selectable objects being ranked and/or arranged in accordance with ranking preferences of a user interacting with the first content item selection interface 550. For example, in the scenario (e.g., the ideal scenario), a user would not have to skip selectable objects the user does not have an interest in to reach selectable objects the user has an interest in; rather, selectable objects in which the user has an interest (e.g., selectable objects that the user selects) may all be in a (e.g., top) section of the first content item selection interface 550, and/or selectable objects in which the user does not have an interest (e.g., selectable objects that the user skips) may all be below the (e.g., top) section of the first content item selection interface 550. In some examples, the first interaction score (e.g., the nDCG metric) may be in a range from at least 0 to at most 1 (e.g., the nDCG metric being equal to 1 may indicate that the DCG metric is the same as the iDCG, whereas the nDCG metric being equal to 0 may indicate that the first user did not select any of the plurality of selectable objects).

In some examples, a first user activeness score may be determined based upon one or more visit events (identified by the content system, for example) in which the first client device 500 accesses (e.g., visits) the first internet resource. The first user activeness score may be representative of a level of activity of the first user with the first internet resource (e.g., how often the first user visits the first internet resource), which may be reflective of a user retention level of the first internet resource. For example, a higher value of the first user activeness score may be representative of the first user visiting the first internet resource more often, which may be reflective of a higher quality of ranked lists and/or content item selection interfaces provided when the first user visits the first internet resource.

In some examples, the one or more visit events may comprise a first visit event (e.g., a most recent event) in which the first content item selection interface 550 is presented via the first internet resource (e.g., as shown in FIG. 5I) and/or one or more other visit events (e.g., prior to the first visit event) in which the first client device 500 (and/or a user account of the first user) accesses and/or interacts with the first internet resource. One or more times associated with the one or more visit events may be determined. For example, the one or more times may comprise a first time associated with the first visit event, and/or one or more other times associated with the one or more other visit events. The first user activeness score may be determined based upon the one or more times.

In an example, the first user activeness score may be determined using a survival model. The survival model may be used to predict, based upon the one or more visit events, an expected duration of time until the first user returns to the first internet resource after the first time of the first visit event (e.g., the expected duration of time may correspond to a duration of time between the first time and an expected time of a next visit event after the first visit event). The first user activeness score may be based upon (and/or may be representative of) the expected duration of time determined using the survival model.

The first user activeness score may be denoted as $A_{q+1}$. The first user activeness score (denoted as $A_{q+1}$) may be determined based upon the first time (denoted as $T_{q+1}$) associated with the first visit event (denoted as q+1), a second time (denoted as Ta) associated with a previous visit event (denoted as q) preceding the first visit event q+1 (e.g., there may be no other visit event associated with the first user and/or the first internet resource between the first visit event q+1 and the previous visit event q), and/or a previous user activeness score (denoted as $A_q$) at the second time $T_q$ associated with the previous visit event q. In an example, the first user activeness score $A_{q+1}$ may correspond to (e.g., may be equal to and/or may be based upon) $e^{-\lambda_0(T_{q+1}-T_q)} \cdot A_q + C$, wherein $\lambda_0$ corresponds to a decay factor and/or C corresponds to an activation score for a visit event (e.g., the first user's return to the first internet resource). In an example, $\lambda_0$ may be set to $1.2 \times 10^{-5}$ seconds$^{-1}$ and/or C may be set to 0.32. Accordingly, the first user activeness score $A_{q+1}$ may depend upon a duration of time (e.g., denoted as $T_{q+1}-T_q$) between the first visit event q+1 and the previous visit event q (e.g., the duration of time may correspond to a time it takes for the first user to return to the first internet resource after the previous visit event q), wherein a higher value of the duration of time may result in a lower value of the first user activeness score $A_{q+1}$. In some examples, a maximum user activeness score (e.g., a maximum value of user activeness scores associated with the first internet resource) may be 1 (e.g., the maximum user activeness score may be truncated to 1). In some examples, an initial user activeness score (denoted as $A_0$) associated with the first internet resource and/or the first user may be set to (e.g., initialized with) 0.5.

Figure 5K:
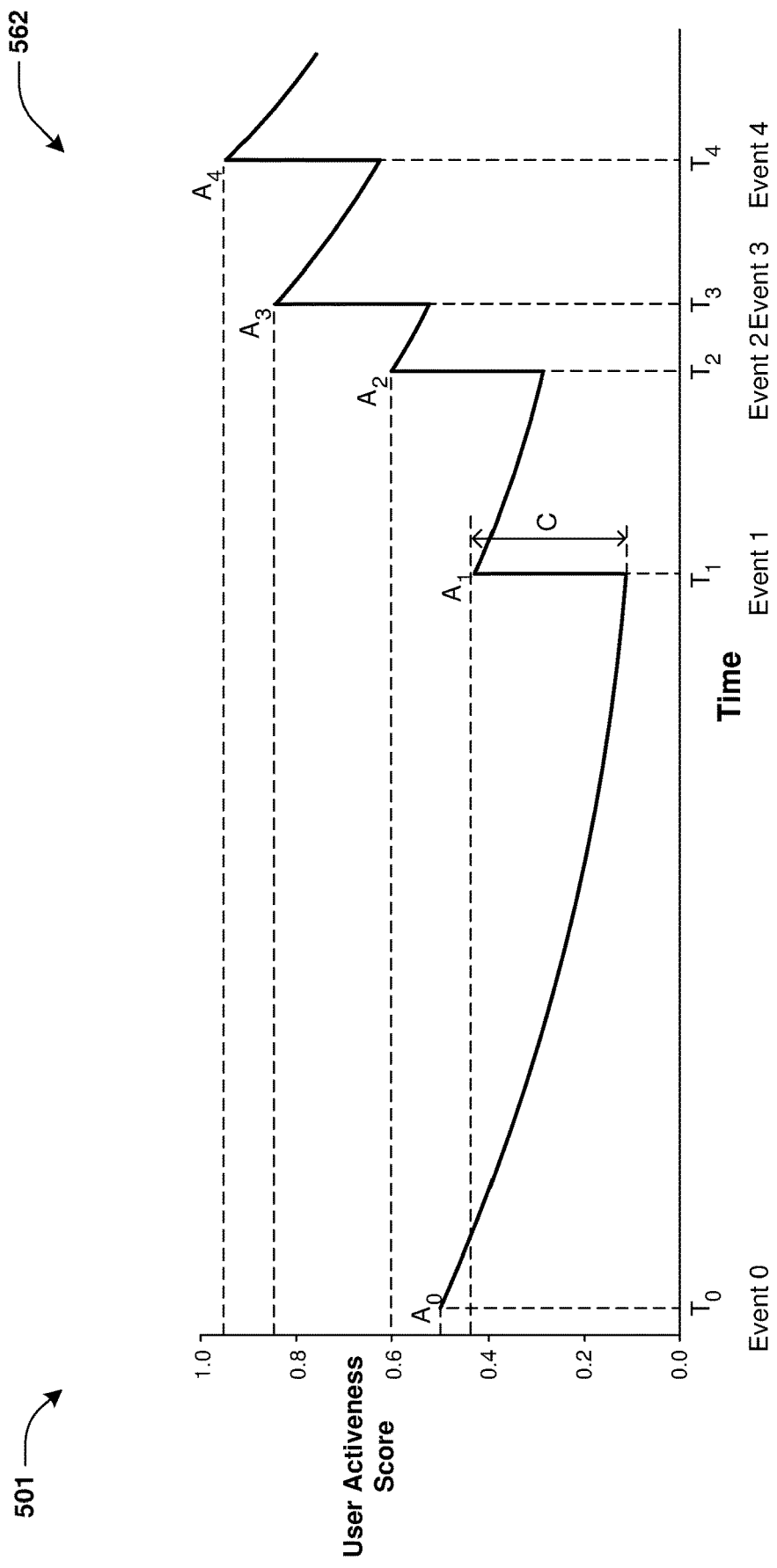
FIG. 5K illustrates a representation of a user activeness score associated with a user over time.

FIG. 5K illustrates a representation 562 of a user activeness score associated with a user over time. In response to an initial visit event "Event 0" of the user with the first internet resource, the user activeness score may be initialized to $A_0$ (e.g., 0.5) at time $T_0$. After being initialized to $A_0$, the user activeness score may decrease (according to the decay factor $\lambda_0$) until a visit event "Event 1" at time $T_1$, which triggers an increase, of the user activeness score, to $A_1$ (e.g., the user activeness score may be increased by the activation score C at time $T_1$). For example, each visit event after the initial visit event "Event 0" may trigger an increase of the user activeness score by the activation score C. For example, the content system may (i) increase the user activeness score to $A_2$ in response to a visit event "Event 2" at time $T_2$, (ii) increase the user activeness score to $A_3$ in response to a visit event "Event 3" at time $T_3$, and/or (iii) increase the user activeness score to $A_4$ in response to a visit event "Event 4" at time $T_4$. More frequent visit events (e.g., more frequent user returns to the first internet resource) may result in more frequent activations by C, and thus may result in a higher value of the user activeness score. The user activeness score may be truncated at 1 (e.g., the user activeness score may not exceed 1).

In some examples, the first user interaction profile, the first interaction score, the first user activeness score, the first plurality of list scores 546 and/or the first plurality of list probabilities may be used to modify (e.g., update, such as optimize and/or train) the content scoring model 510 and/or the exploration model 518 to generate an updated version of the content scoring model 510 and/or an updated version of the exploration model 518. In some examples, the content scoring model 510 and/or the exploration model 518 may be modified by updating one or more parameters (e.g., trainable parameters) of the content scoring model 510 and/or the exploration model 518 based upon the first user interaction profile, the first interaction score, the first user activeness score, the first plurality of list scores 546 and/or the first plurality of list probabilities. For example, the one or more parameters may comprise one or more weights of the content scoring model 510 and/or the exploration model 518.

In an example, a first reward may be determined based upon the first user interaction profile, the first interaction score, the first user activeness score, the first plurality of list scores 546 and/or the first plurality of list probabilities. For example, the first reward may be used to modify (e.g., update, such as optimize and/or train) the content scoring model 510 and/or the exploration model 518 to generate the updated version of the content scoring model 510 and/or the updated version of the exploration model 518. In an example, the first reward may correspond to (e.g., may be equal to and/or may be based upon) $((1-\beta) \cdot I)+(\beta \cdot A)$, wherein I may correspond to the first interaction score (e.g., the nDCG metric), A may correspond to the first user activeness score, and/or $\beta$ may correspond to a coefficient that can be adjusted to adjust an importance of the first user activeness score relative to the first interaction score. In an example, $\beta$ may be set to 0.5 to set the same importance for the first user activeness score and the first interaction score. Alternatively and/or additionally, $\beta$ may be set to a value lower than 0.5 to set a lower importance of the first user activeness score relative to an importance for the first interaction score. Other values of $\beta$ are within the scope of the present disclosure. In some examples, the first reward may be in a range from at least 0 (e.g., corresponding to a lower and/or negative reward) to at most 1 (e.g., corresponding to a higher and/or positive reward).

In some examples, the content system may comprise a ranking system. The ranking system may comprise the content scoring model 510 and/or the exploration model 518. A reinforcement learning framework may be implemented in which the ranking system is updated and/or improved using feedback (e.g., user interaction profiles, interaction scores, user activeness scores, rewards, list scores, list probabilities, etc.). For example, the reinforcement learning framework may be implemented to modify (e.g., update, such as optimize and/or train) the content scoring model 510 and/or the exploration model 518 (such as by modifying one or more parameters, such as trainable parameters, of the content scoring model 510 and/or the exploration model 518 based upon the feedback).

Figure 5L:
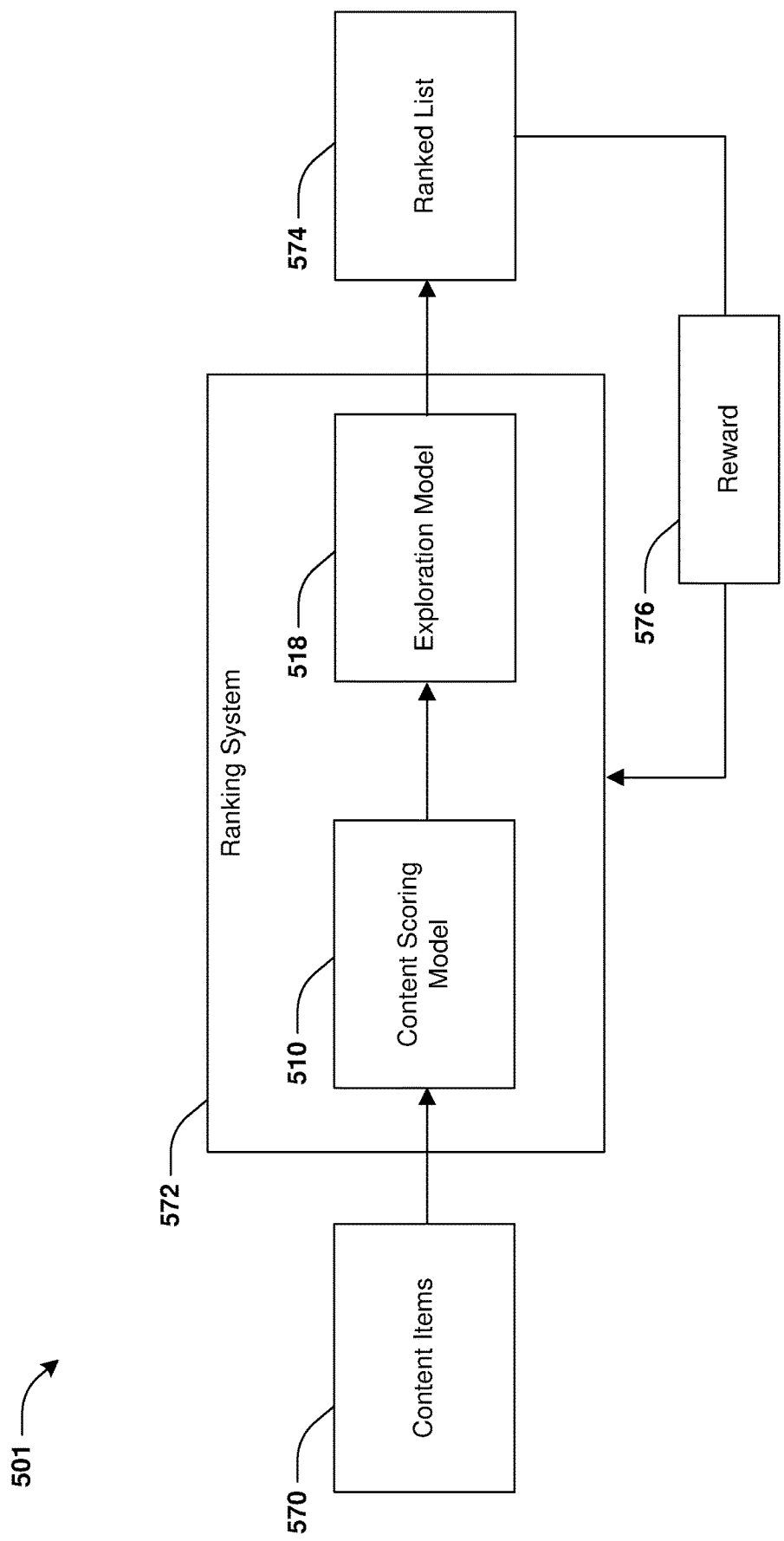
FIG. 5L is a component block diagram illustrating an example system for ranking content items, where a ranking system is updated based upon a reward.

FIG. 5L illustrates an example of the reinforcement learning framework associated with the ranking system (shown with reference number 572). The first plurality of content items (shown with reference number 570) may be input to the ranking system 572. The content scoring model 510 and/or the exploration model 518 of the ranking system 572 may use the techniques provided herein to output the determined ranked list (shown with reference number 574), which may be used to arrange the plurality of selectable objects in the first content item selection interface 550. The first reward (shown with reference number 576) may be determined based upon feedback associated with the first content item selection interface 550. The first reward 576 and/or the determined ranked list 574 (used to arrange selectable objects of the first content item selection interface 550) may be used to modify (e.g., update) the ranking system 572. For example, a ranking strategy of the ranking system 572 may be updated based upon the first reward 576 and/or the determined ranked list 574 (e.g., the ranking strategy may be updated by modifying one or more parameters of the content scoring model 510 and/or the exploration model 518). In this way, subsequent ranked lists output by the ranking system 572 using the updated ranking strategy may be more aligned with users' ranking preferences, thereby providing users with improved user experiences. In an example, the feedback includes user interactions corresponding to the representation 560 of the first user interaction profile shown in FIG. 5J (where selectable objects of higher-ranked "Content B" and "Content C" are skipped while a selectable object of lower-ranked "Content A" is selected). In the example, the ranking strategy may be updated (based upon the first reward 576 and/or the determined ranked list 574) such that, in response to a subsequent request for content, the ranking system 572 outputs a ranked list that indicates (i) a higher ranking for "Content A" that was selected (e.g., "Content A" may have a higher ranking in the ranked list compared to the determined ranked list 574 since "Content A" was selected by the first user) and/or (ii) lower rankings for "Content B" and/or "Content C" (e.g., "Content B" and/or "Content C" may have lower rankings in the ranked list compared to the determined ranked list 574 since "Content B" and/or "Content C" were skipped by the first user).

It may be appreciated that by using the ranking system 572 to output ranked lists and/or updating the ranking system 572 based upon feedback associated with the ranked lists, the content system may implement a closed-loop process allowing usage of feedback to tailor and/or continuously and/or periodically update the ranking system 572 used to arrange content for users, thereby improving (e.g., continuously and/or periodically improving over time) a quality and/or accuracy of content item rankings output by the ranking system 572. For example, in the closed-loop process, feedback associated with the ranked lists may be used to tailor and/or continuously and/or periodically update (e.g., optimize and/or train) one or more machine learning models of the ranking system 572 (e.g., the one or more machine learning models may comprise the content scoring model 510 and/or the exploration model 518), thereby improving (e.g., continuously and/or periodically improving over time) a quality and/or accuracy of content item rankings output using the one or more machine learning models. Closed-loop control may reduce errors and produce more efficient operation of a computer system which implements the ranking system 572. The reduction of errors and/or the efficient operation of the computer system may improve operational stability and/or predictability of operation. Accordingly, using processing circuitry to implement closed loop control described herein may improve operation of underlying hardware of the computer system.

In some examples, updating the ranking system 572 based upon the first reward 576 and/or the determined ranked list 574 may comprise (i) modifying (e.g., updating, such as optimizing and/or training) the content scoring model 510 based upon the first reward 576 and/or the determined ranked list 574 to generate an updated version of the content scoring model 510 (e.g., one or more parameters of the content scoring model 510 may be modified based upon the first reward 576 and/or the determined ranked list 574 to generate the updated version of the content scoring model 510), and/or (ii) modifying (e.g., updating, such as optimizing and/or training) the exploration model 518 based upon the first reward 576 and/or the determined ranked list 574 to generate an updated version of the exploration model 518 (e.g., one or more parameters of the exploration model 518 may be modified based upon the first reward 576 and/or the determined ranked list 574 to generate the updated version of the exploration model 518). The updated version of the content scoring model 510 and/or the updated version of the exploration model 518 may be used to generate one or more ranked lists in response to one or more subsequent requests for content received by the content system.

For example, in response to receiving a second request for content associated with a second client device, a second content item selection interface comprising a second plurality of selectable objects corresponding to a second plurality of content items may be generated using the updated version of the content scoring model 510 and/or the updated version of the exploration model 518. The second content item selection interface may be generated in response to the second request for content using one or more of the techniques provided herein with respect to generating the first content item selection interface 550 in response to the request for content 504.

In an example, a second plurality of content item scores associated with the second plurality of content items may be determined using the updated version of the content scoring model 510. The second plurality of content item scores may be determined using one or more of the techniques provided herein with respect to determining the first plurality of content item scores. A ranked list (hereinafter referred to as "second determined ranked list") may be generated based upon the second plurality of content item scores using the updated version of the exploration model 518. The second determined ranked list is indicative of rankings of the second plurality of content items. The second determined ranked list may be generated using one or more of the techniques provided herein with respect to generating the determined ranked list. Embodiments are contemplated in which merely one of the content scoring model 510 or the exploration model 518 is updated based upon the first reward 576. Accordingly, in some examples, the second plurality of content item scores may be determined using the content scoring model 510 (rather than the updated version of the content scoring model 510, for example), or the second determined ranked list may be determined using the exploration model 518 (rather than the updated version of the exploration model 518, for example). The second plurality of selectable objects in the second content item selection interface may be arranged according to rankings indicated by the second determined ranked list. The second content item selection interface may be provided for display on the second client device. For example, the second content item selection interface may be presented via the first internet resource on the second client device.

Exemplary techniques for updating the ranking system 572 (e.g., modifying the content scoring model 510 and/or the exploration model 518) based upon feedback associated with a ranked list are provided. In some examples, N content items (e.g., the first plurality of content items 570) may be sampled from a distribution μ (e.g., the N content items may be sampled according to $X_t \sim \mu(\cdot) \forall t$). There may be N! different permutations of the N content items, wherein each permutation may represent an action (e.g., a ranked list) of the ranking system 572 in the reinforcement learning framework. An action, denoted as $a_t$, may correspond to a ranked list determined at time t. An action $a_t$ may be sampled according to $a_t \sim \pi(\cdot | X_t)$, wherein $\pi(\cdot | X_t)$ corresponds to a distribution of ranked lists (e.g., all possible ranked lists) of the N content items (e.g., the action $a_t$ may be sampled from the distribution of ranked lists $\pi(\cdot | X_t)$). In some examples, each action $a_t$ is accompanied by a reward (e.g., the first reward 576) from a user, wherein the reward, denoted as $r_t$, may be sampled from a distribution $\phi$ according to $r_t \sim \phi(\cdot | X_t, a_t)$. In some examples, an objective of the ranking system 572 is to optimize $\pi$ that maximizes an expected reward, such as according to Equation 1:

$$\pi^* = \arg\max_{\pi} E_{X \sim \mu} E_{a \sim \pi(\cdot | X)} E_{r \sim \phi(\cdot | X, a)}[r].$$

In some examples, a distribution over actions may be parameterized by $\theta$, wherein $\pi_\theta$ may be used to represent the distribution over actions in Equation 2:

$$\theta^* = \arg\max_{\theta} E_{X \sim \mu} E_{a \sim \pi_\theta(\cdot | X)} E_{r \sim \phi(\cdot | X, a)}[r].$$

In some examples, the parameter $\theta$ may be optimized with gradient ascent at each request for content (e.g., the request for content 504) associated with the first internet resource. Alternatively and/or additionally, the parameter $\theta$ may be optimized via batches (e.g., mini-batches) of requests for content, wherein a batch size of the batches is equal to m (e.g., the batch size of the batches corresponds to a quantity of requests for content in a batch used to optimize the parameter $\theta$). In an example, the parameter $\theta$ may be optimized according to Equation 3: $\theta_{t+1} = \theta_t + \eta_t \cdot \hat{g}(\theta_t)$, and/or Equation 4:

$$\hat{g}(\theta_t) = \frac{1}{m} \sum_{i=1}^{m} \nabla_\theta \left( E_{X \sim \mu} E_{a \sim \pi_\theta(\cdot | X)} E_{r \sim \phi(\cdot | X, a)}[r] \right),$$

wherein $\eta_t$ may correspond to a learning rate (e.g., a predefined learning rate) of the ranking system 572, $\hat{g}(\theta_t)$ may correspond to a batch gradient, and/or $\nabla_\theta$ corresponds to a gradient computation associated with optimizing the parameter $\theta$ via one or more batches. In some examples, Equation 4 may be simplified as $$:\hat{g}(\theta_t) = \frac{1}{m} \sum_{i=1}^{m} \nabla_\theta \log \pi_\theta n_\theta(a_i | X_i) \cdot r_i,$$

which may be used to update the ranking system 572 (e.g., by optimizing the parameter $\theta$) based upon actions $a_i$ (e.g., determined ranked lists used to arrange selectable objects in response to requests for content) and/or rewards $r_i$ (e.g., rewards associated with the determined ranked lists corresponding to the actions $a_i$) associated with requests for content in a batch of m requests for content. In an example in which the batch comprises the request for content 504, the ranking system 572 may be updated (e.g., by optimizing the parameter $\theta$) using the determined ranked list 574 (generated at act 408) and/or the first reward 576.

Embodiments are contemplated in which a content item presentation interface is generated based upon the determined ranked list 574. The content item presentation interface may comprise the first plurality of content items 570. The first plurality of content items 570 may be arranged, in the content item presentation interface, according to rankings of the first plurality of content items 570 indicated by the determined ranked list 574. In an example, the content item presentation interface (rather than or in addition to the first content item selection interface 550, for example) may be provided for display on the first client device 500. For example, the content item presentation interface may be presented via the first internet resource. A higher ranked content item may be at least one of higher, before, more prominent, etc. than a lower ranked content item in the content item presentation interface. In an example in which the first plurality of content items 570 comprises social media posts, the content item presentation interface may correspond to a ranked list of social media posts. Other types of content items (e.g., news articles, informational articles, videos, advertisements, images, links, dating profiles, social media profiles, blog posts, songs, etc.) of the first plurality of content items 570 (displayed in the content item presentation interface) are within the scope of the present disclosure.

Alternatively and/or additionally, implementation of at least some of the disclosure subject matter may lead to benefits including, but not limited to, less manual effort needed to be performed to update the ranking system 572 (e.g., as a result of automatically determining rewards based upon feedback and/or updating the ranking system 572 based upon the rewards, as compared to requiring training information to be manually handcrafted for use in training supervised machine learning models, which may require a significant amount of time and/or effort).

Alternatively and/or additionally, implementation of the disclosed subject matter may lead to benefits including more accurately ranking content items (e.g., as a result of automatically determining rewards based upon feedback and/or updating the ranking system 572 based upon the rewards, which may improve an accuracy and/or performance of the ranking system 572 over time such that the ranking system 572 can output a ranked list that has a higher probability of aligning with a user's ranking preferences).

In some examples, at least some of the disclosed subject matter may be implemented on a client device, and in some examples, at least some of the disclosed subject matter may be implemented on a server (e.g., hosting a service accessible via a network, such as the Internet).

In some examples, one, some and/or all instances of the term "internet resource" may be replaced with "network resource", which may refer to a resource that is accessed over a network (e.g., private network, public network, the Internet, etc.).

Figure 6:
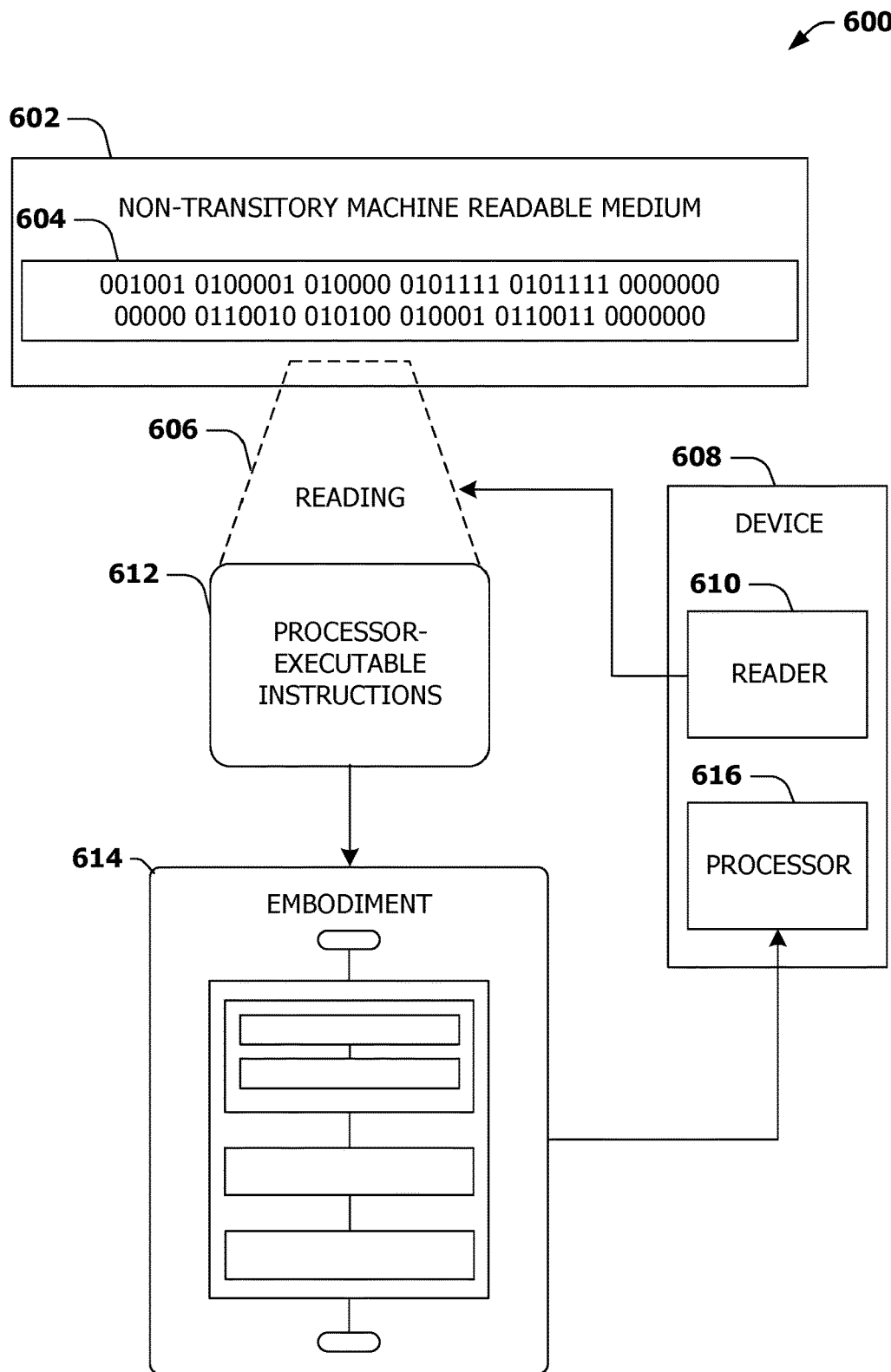
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIGS. 4, for example. In some embodiments, the processor-executable instructions 612 are configured to cause implementation of a system, such as at least some of the example system 501 of FIGS. 5A-5L, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:

receiving a request for content associated with a client device;

in response to receiving the request for content, identifying a plurality of content items comprising a first content item and a second content item;

accessing one or more machine learning models stored in a computer system as part of a ranking system;

determining, using a content scoring model of the ranking system, a content item score for each of the plurality of content items comprising a first content item score for the first content item and a second content item score for the second content item, wherein the content scoring model is one of the one or more machine learning models stored in the computer system;

generating, using an exploration model of the ranking system, a first ranked list of the plurality of content items indicative of the first content item being ranked higher than the second content item;

generating, using the exploration model, a second ranked list of the plurality of content items indicative of the first content item being ranked lower than the second content item;

generating a first list score for the first ranked list based upon a first function of (i) first rankings indicative of the first content item being ranked higher than the second content item and (ii) the first content item score of the first content item and the second content item score of the second content item;

generating a second list score for the second ranked list based upon a second function of (i) second rankings indicative of the first content item being ranked lower than the second content item and (ii) the first content item score of the first content item and the second content item score of the second content item;

in response to the request for content associated with the client device, selecting, by the computer system implementing the ranking system and from among a plurality of ranked lists comprising the first ranked list and the second ranked list, the first ranked list based upon the first list score for the first ranked list being higher than the second list score for the second ranked list;

arranging, by the computer system implementing the ranking system, a plurality of selectable objects on a content item selection interface according to rankings indicated by the first ranked list; and implementing, using processing circuitry, a closed-loop control process to continuously update the one or more machine learning models stored as part of the ranking system in the computer system based upon (i) feedback reflective of an impact of one or more content item selection interfaces on short-term behavior associated with one or more client devices and (ii) feedback reflective of an impact of the one or more content item selection interfaces on long-term behavior associated with the one or more client devices, wherein the closed-loop control process is associated with a reduction of errors and an improvement of operation of hardware of the computer system.

2. The method of claim 1, comprising:
providing the content item selection interface for display on the client device.

3. The method of claim 2, comprising:
after providing the content item selection interface, receiving one or more signals from the client device;
determining, based upon the one or more signals, a user interaction profile indicative of one or more user interactions with the content item selection interface; and
at least one of:
  modifying, based upon the user interaction profile, the content scoring model to generate an updated version of the content scoring model; or
  modifying, based upon the user interaction profile, the exploration model to generate an updated version of the exploration model.

4. The method of claim 3, wherein the user interaction profile is indicative of at least one of:
one or more first selectable objects, of the plurality of selectable objects, selected by a user of the client device; or
one or more second selectable objects, of the plurality of selectable objects, skipped by the user.

5. The method of claim 3, wherein:
the content item selection interface is displayed on the client device via a first internet resource during a first visit event in which the client device accesses the first internet resource;
the method comprises:
  determining one or more times associated with one or more visit events comprising the first visit event; and
  determining, based upon the one or more times, a user activeness score corresponding to a relationship between the first internet resource and a user of the client device; and at least one of:
  modifying the content scoring model to generate the updated version of the content scoring model is performed based upon the user activeness score; or
  modifying the exploration model to generate the updated version of the exploration model is performed based upon the user activeness score.

6. The method of claim 3, comprising:
receiving a second request for content associated with a second client device; and
in response to receiving the second request for content, generating, using at least one of the updated version of the content scoring model or the updated version of the exploration model, a second content item selection interface comprising a second plurality of selectable objects corresponding to a second plurality of content items.

7. The method of claim 6, wherein generating the second content item selection interface comprises:
determining, using the updated version of the content scoring model, a second plurality of content item scores associated with the second plurality of content items;
generating, using the exploration model and based upon the second plurality of content item scores, a second ranked list indicative of rankings of the second plurality of content items; and
arranging the second plurality of selectable objects according to rankings indicated by the second ranked list.

8. The method of claim 6, wherein generating the second content item selection interface comprises:
identifying the second plurality of content items;
determining, using the content scoring model, a second plurality of content item scores associated with the second plurality of content items;
generating, using the updated version of the exploration model and based upon the second plurality of content item scores, a second ranked list indicative of rankings of the second plurality of content items; and
arranging the second plurality of selectable objects according to rankings indicated by the second ranked list.

9. The method of claim 6, wherein generating the second content item selection interface comprises:
identifying the second plurality of content items;
determining, using the updated version of the content scoring model, a second plurality of content item scores associated with the second plurality of content items;
generating, using the updated version of the exploration model and based upon the second plurality of content item scores, a second ranked list indicative of rankings of the second plurality of content items; and
arranging the second plurality of selectable objects according to rankings indicated by the second ranked list.

10. The method of claim 1, wherein:
the content scoring model comprises at least one of a neural network, a tree-based model, a decision tree model, a support vector machine (SVM), a Bayesian network model, a k-Nearest Neighbors (k-NN) model, a K-Means model, a random forest model or a machine learning model used to perform at least one of linear regression, logistic regression, dimensional reduction or gradient boosting; and
the exploration model comprises a Plackett-Luce (PL) model.

11. The method of claim 1, wherein generating the first ranked list comprises:
performing an iterative sampling process comprising a plurality of sampling iterations, wherein:
a first sampling iteration of the plurality of sampling iterations is associated with a first ranking of the first ranked list; and
the first sampling iteration comprises:
determining, using the exploration model and based upon the first content item score of the first content item and the second content item score of the second content item, a plurality of probabilities associated with the first content item and the second content item, wherein a first probability of the plurality of probabilities is associated with the first content item and corresponds to a probability that the first content item is sampled in the first sampling iteration; and
sampling, for the first ranking of the first ranked list, a content item of the first content item and the second content item according to the plurality of probabilities.

12. A computing device comprising:
a processor; and
memory comprising processor-executable instructions that when executed by the processor cause performance of operations, the operations comprising:
receiving a request for content associated with a client device;
in response to receiving the request for content, identifying a plurality of content items comprising a first content item and a second content item;
accessing one or more machine learning models stored in a computer system as part of a ranking system;
determining, using a content scoring model of the ranking system, a content item score for each of the plurality of content items comprising a first content item score for the first content item and a second content item score for the second content item, wherein the content scoring model is one of the one or more machine learning models stored in the computer system;
generating, using an exploration model of the ranking system, a first ranked list of the plurality of content items indicative of the first content item being ranked higher than the second content item;
generating, using the exploration model, a second ranked list of the plurality of content items indicative of the first content item being ranked lower than the second content item;
generating a first list score for the first ranked list based upon a first function of (i) first rankings indicative of the first content item being ranked higher than the second content item and (ii) the first content item score of the first content item and the second content item score of the second content item;
generating a second list score for the second ranked list based upon a second function of (i) second rankings indicative of the first content item being ranked lower than the second content item and (ii) the first content item score of the first content item and the second content item score of the second content item;
in response to the request for content associated with the client device, selecting, by the computer system implementing the ranking system and from among a plurality of ranked lists comprising the first ranked list and the second ranked list, the first ranked list based upon the first list score for the first ranked list being higher than the second list score for the second ranked list;
generating, based upon the first ranked list, a content item presentation interface comprising the first content item and the second content item; and
implementing, using processing circuitry, a closed-loop control process to continuously update the one or more machine learning models stored as part of the ranking system in the computer system, wherein the closed-loop control process is associated with a reduction of errors and an improvement of operation of hardware of the computer system.

13. The computing device of claim 12, the operations comprising:
providing the content item presentation interface for display on the client device.

14. The computing device of claim 13, the operations comprising:
after providing the content item presentation interface, receiving one or more signals from the client device;
determining, based upon the one or more signals, a user interaction profile indicative of one or more user interactions with the content item presentation interface; and
at least one of:
modifying, based upon the user interaction profile, the content scoring model to generate an updated version of the content scoring model; or
modifying, based upon the user interaction profile, the exploration model to generate an updated version of the exploration model.

15. The computing device of claim 14, wherein the user interaction profile is indicative of at least one of:
one or more first content items, of the first content item and the second content item, selected by a user of the client device; or
one or more second content items, of the first content item and the second content item, skipped by the user.

16. The computing device of claim 14, wherein:
the content item presentation interface is displayed on the client device via a first internet resource during a first visit event in which the client device accesses the first internet resource;
the operations comprise:
determining one or more times associated with one or more visit events comprising the first visit event; and
determining, based upon the one or more times, a user activeness score corresponding to a relationship between the first internet resource and a user of the client device; and
at least one of:
modifying the content scoring model to generate the updated version of the content scoring model is performed based upon the user activeness score; or
modifying the exploration model to generate the updated version of the exploration model is performed based upon the user activeness score.

17. The computing device of claim 14, the operations comprising:
receiving a second request for content associated with a second client device; and
in response to receiving the second request for content, generating, using at least one of the updated version of the content scoring model or the updated version of the exploration model, a second content item presentation interface comprising a second plurality of content items.

18. The computing device of claim 12, wherein generating the first ranked list comprises:
performing an iterative sampling process comprising a plurality of sampling iterations, wherein:
a first sampling iteration of the plurality of sampling iterations is associated with a first ranking of the first ranked list; and
the first sampling iteration comprises:
determining, using the exploration model and based upon the first content item score of the first content item and the second content item score of the second content item, a plurality of probabilities associated with the first content item and the second content item, wherein a first probability of the plurality of probabilities is associated with the first content item and corresponds to a probability that the first content item is sampled in the first sampling iteration; and
sampling, for the first ranking of the first ranked list, a content item of the first content item and the second content item according to the plurality of probabilities.

19. A non-transitory machine readable medium having stored thereon processor-executable instructions that when executed cause performance of operations, the operations comprising:
receiving a request for content associated with a client device;
in response to receiving the request for content, identifying a plurality of content items comprising a first content item and a second content item;
accessing one or more machine learning models stored in a computer system as part of a ranking system;
determining, using a content scoring model of the ranking system, a content item score for each of the plurality of content items comprising a first content item score for the first content item and a second content item score for the second content item, wherein the content scoring model is one of the one or more machine learning models stored in the computer system;
generating, using an exploration model of the ranking system, a first ranked list of the plurality of content items indicative of the first content item being ranked higher than the second content item;
generating, using the exploration model, a second ranked list of the plurality of content items indicative of the first content item being ranked lower than the second content item;
generating a first list score for the first ranked list based upon a first function of (i) first rankings indicative of the first content item being ranked higher than the second content item and (ii) the first content item score of the first content item and the second content item score of the second content item;
generating a second list score for the second ranked list based upon a second function of (i) second rankings indicative of the first content item being ranked lower than the second content item and (ii) the first content item score of the first content item and the second content item score of the second content item;
in response to the request for content associated with the client device, selecting, by the computer system implementing the ranking system and from among a plurality of ranked lists comprising the first ranked list and the second ranked list, the first ranked list based upon the first list score for the first ranked list being higher than the second list score for the second ranked list;
generating, based upon the first ranked list, a content item selection interface comprising a plurality of selectable objects corresponding to content items of the first content item and the second content item; and
implementing, using processing circuitry, a closed-loop control process to continuously update the one or more machine learning models stored as part of the ranking system in the computer system based upon
(i) feedback reflective of an impact of one or more content item selection interfaces on short-term behavior associated with one or more client devices and
(ii) feedback reflective of an impact of the one or more content item selection interfaces on long-term behavior associated with the one or more client devices, wherein the closed-loop control process is associated with a reduction of errors and an improvement of operation of hardware of the computer system.

20. The non-transitory machine readable medium of claim 19, the operations comprising:
providing the content item selection interface for display on the client device.

* * * * *